(12) United States Patent
Wong et al.

(10) Patent No.: US 9,471,891 B2
(45) Date of Patent: Oct. 18, 2016

(54) METHOD, SYSTEM AND APPARATUS FOR AUTOMATIC QUALITY CONTROL USING A PLURALITY OF COMPUTERS

(75) Inventors: Kevin Nelson Wong, Toronto (CA); Sean Sebastian Kirby, Toronto (CA); Emily Auban Stover, Toronto (CA); Jason Dean Tham, Toronto (CA)

(73) Assignee: Nulogy Corporation, Toronto, Ontario (CA)

( * ) Notice: Subject to any disclaimer, the term of this patent is extended or adjusted under 35 U.S.C. 154(b) by 932 days.

(21) Appl. No.: 13/236,875

(22) Filed: Sep. 20, 2011

(65) Prior Publication Data
US 2012/0078410 A1    Mar. 29, 2012

Related U.S. Application Data

(60) Provisional application No. 61/386,167, filed on Sep. 24, 2010, provisional application No. 61/387,052, filed on Sep. 28, 2010.

(51) Int. Cl.
*G05B 19/18* (2006.01)
*G06F 19/00* (2011.01)
*G06Q 10/00* (2012.01)
(Continued)

(52) U.S. Cl.
CPC ............................... *G06Q 10/06395* (2013.01)

(58) Field of Classification Search
CPC ................................................ G06Q 10/06395
USPC ............... 700/109, 3, 110–112, 121; 702/84; 705/7.41, 7, 41; 709/203
See application file for complete search history.

(56) References Cited

U.S. PATENT DOCUMENTS 4,571,685 A * 2/1986 Kamoshida .................... 700/108
5,189,624 A * 2/1993 Barlow et al. ................. 700/169
(Continued)

FOREIGN PATENT DOCUMENTS

CN    101490707 A    7/2009
EP      2169611 A1    3/2010

OTHER PUBLICATIONS

PCT/CA2011/001049 International Search Report dated Dec. 20, 2011.
(Continued)

*Primary Examiner* — Robert Fennema
*Assistant Examiner* — Thomas Stevens
(74) *Attorney, Agent, or Firm* — Kristjan Spence; Perry + Currier Inc.

(57) ABSTRACT

A system and method for automatic quality control is provided. A database is maintained storing quality control rules for producing a product, the quality control rules determined via a first computing device associated with a first entity controlling production of the product, the database maintained by a second computing device associated with a second entity for maintaining quality control of the product, the product produced by a plurality of production lines respectively associated with third entities. Quality control data is received at the second computing device from data collection devices at the plurality of production lines, each of the data collection devices enabled to collect the quality control data for the product. At the second computing device, the quality control data is compared with the quality control rules; at least one quality control event is triggered when the quality control data fails at least one of the quality control rules.

14 Claims, 11 Drawing Sheets

(51) Int. Cl.
*G06Q 40/00* (2012.01)
*G06Q 10/06* (2012.01)
*G06F 15/16* (2006.01)

(56) References Cited

U.S. PATENT DOCUMENTS

| | | | | |
|---|---|---|---|---|
| 5,285,375 | A * | 2/1994 | Kim | 700/1 |
| 5,497,331 | A * | 3/1996 | Iriki et al. | 700/121 |
| 6,477,432 | B1 * | 11/2002 | Chen et al. | 700/51 |
| 6,505,094 | B2 * | 1/2003 | Pape et al. | 700/217 |
| 6,556,884 | B1 * | 4/2003 | Miller et al. | 700/121 |
| 6,560,506 | B2 * | 5/2003 | Toprac | 700/121 |
| 6,560,509 | B2 * | 5/2003 | Williams et al. | 700/216 |
| 6,574,522 | B1 | 6/2003 | Douglas | |
| 6,580,959 | B1 * | 6/2003 | Mazumder | 700/121 |
| 6,647,309 | B1 * | 11/2003 | Bone | 700/121 |
| 6,954,883 | B1 * | 10/2005 | Coss et al. | 714/47.2 |
| 7,100,826 | B1 * | 9/2006 | Phan et al. | 235/385 |
| 7,236,843 | B1 * | 6/2007 | Wizelman et al. | 700/100 |
| 7,363,099 | B2 * | 4/2008 | Smith et al. | 700/121 |
| 7,380,213 | B2 * | 5/2008 | Pokorny | B23Q 35/12 345/440 |
| 7,813,822 | B1 * | 10/2010 | Hoffberg | 700/94 |
| 8,510,067 | B2 * | 8/2013 | Zelin et al. | 702/84 |
| 8,712,929 | B1 * | 4/2014 | Bickford | G06N 99/005 700/286 |
| 2002/0082736 | A1 | 6/2002 | Lech et al. | |
| 2002/0165912 | A1 * | 11/2002 | Wenocur et al. | 709/203 |
| 2003/0061081 | A1 * | 3/2003 | Kellond et al. | 705/7 |
| 2003/0120446 | A1 | 6/2003 | Xie et al. | |
| 2003/0229410 | A1 * | 12/2003 | Smith et al. | 700/109 |
| 2005/0060057 | A1 * | 3/2005 | Wu et al. | 700/109 |
| 2005/0188338 | A1 * | 8/2005 | Kroyan et al. | 716/9 |
| 2005/0192775 | A1 * | 9/2005 | Parvin et al. | 702/169 |
| 2006/0129345 | A1 * | 6/2006 | Parvin et al. | 702/119 |
| 2007/0135957 | A1 * | 6/2007 | Ogawa et al. | 700/109 |
| 2009/0013210 | A1 * | 1/2009 | McIntosh et al. | 714/4 |
| 2009/0037013 | A1 * | 2/2009 | Hendler | G05B 19/41875 700/103 |
| 2009/0228129 | A1 * | 9/2009 | Moyne | G05B 19/41865 700/102 |
| 2009/0234485 | A1 * | 9/2009 | Behm et al. | 700/110 |
| 2010/0049566 | A1 * | 2/2010 | Fukuoka et al. | 705/7 |
| 2010/0198905 | A1 * | 8/2010 | McKay et al. | 709/203 |
| 2012/0078410 | A1 * | 3/2012 | Wong et al. | 700/110 |
| 2012/0083917 | A1 * | 4/2012 | Zhou | G05B 13/048 700/110 |
| 2012/0136470 | A1 * | 5/2012 | Deans et al. | 700/110 |
| 2012/0198274 | A1 * | 8/2012 | Cho et al. | 714/15 |
| 2012/0215913 | A1 * | 8/2012 | Okuno et al. | 709/224 |

OTHER PUBLICATIONS

PCT/CA2011/001049 Written Opinion dated Dec. 20, 2011.
English Translation of Office Action Dated Jan. 5, 2015, issued on Corresponding Chinese Patent Application No. 201180056510.5, 11 pages.

* cited by examiner

GUI
900

PRODUCTION RUN NOT STARTED

Conveyor belt cleared of previous product: Yes ● No ○

Confirm colorimeter calibrated: Yes ● No ○

METHOD, SYSTEM AND APPARATUS FOR AUTOMATIC QUALITY CONTROL USING A PLURALITY OF COMPUTERS

CROSS-REFERENCE TO RELATED APPLICATIONS

This application claims priority from U.S. Provisional App. No. 61/386,167 filed Sep. 24, 2010 and U.S. Provisional App. No. 61/387,052 filed Sep. 28, 2010, the contents of which are incorporated herein by reference.

FIELD

The specification relates generally to quality control, and specifically to a method, system and apparatus for automatic quality control using a plurality of computers.

BACKGROUND

Quality control in a contract manufacturing environment is demanding as a given manufacturer can manufacture a wide variety of finished goods in short period of time, reconfiguring a production line, often daily, to handle a given production run. When a brand owner contracts production of a product to more than one contract manufacturer, maintaining quality control across the different production environments can be challenge.

SUMMARY

A first aspect of the specification provides a method for automatic quality control using a plurality of computers, comprising: maintaining a database storing quality control rules for producing a product, the quality control rules determined via a first computing device associated with a first entity controlling production of the product, the database maintained by a second computing device associated with a second entity for maintaining quality control of the product, the product produced by a plurality of production lines respectively associated with third entities; receiving quality control data at the second computing device from data collection devices at each of the plurality of production lines, each of the data collection devices enabled to collect the quality control data for the product; and at the second computing device, comparing the quality control data with the quality control rules and triggering at least one quality control event when the quality control data fails at least one of the quality control rules.

At least one of the quality control rules can be normalized for a respective production line of the plurality of production lines by adjusting at least one of the quality control rules according to local data indicative of local conditions at the respective production line. The local data can comprise at least one of: a local production rate for producing the product at the respective production line; at least one setting at equipment for producing the product at the respective production line; and at least one condition particular to the respective production line.

The method can further comprise adjusting at least one of the quality control rules for a respective production line based on local data at the respective production line. At least one of the quality control rules can comprise at least one threshold value and the adjusting at least one of the quality control rules can comprise adjusting the threshold.

The method can further comprise: collecting local data indicative of local conditions at each of the plurality of production lines; and adjusting the quality control rules for respective ones of the plurality of production lines based on the local data.

A first portion of the quality control rules can originate at computing devices associated with respective ones of the third entities, the first portion comprising local quality control rules for respective production lines.

At least a portion of the data collection devices can each comprise a mobile communication device for inputting the quality control data at electronic forms stored at the mobile communication device.

At least a portion of the data collection devices can each comprise an electronic data collection device for automatic collection of the quality control data. The electronic data collection device can comprise at least one: a camera; a colorimeter, an image recognition algorithm; a character recognition algorithm; a colour detecting algorithm; an RFID (radio frequency identification) device; an RFID sensor; a barcode reader; a weigh scale; a temperature sensor; a moisture sensor; a metal detector; a vibration sensor; a pressure sensor; a gas sensor; a chemical sensor; a biological element sensor; a laser beam based reading device; a laser beam based counting device; an optical reader device; an electrical measurement device; and a counting device.

The quality control rules can comprise thresholds such that a given quality control rule is failed when the quality control data does not meet a respective threshold and the given quality control rule is passed when the quality control data meets the respective threshold.

At least one quality control event can be triggered at a first one of the third entities based on given quality control data from a second one of the third entities failing the at least of the quality control rules.

At least one quality control event can comprise at least one of: notifying the first entity of a failure of the quality control rules; notifying a respective one of the third entities associated with the failure; a recall order; a change in the quality control rules associated with at least one of the third entities; updating data collection parameters at the data collection devices; an order to quarantine inventory that does not meet the quality control rules; marking down a quality score of the respective one of the third entities associated with failure; a quality event associated with at least one of a supplier, a contract manufacturer and a contract packager; issuing a remedial action order to correct for the failure; an order to modify defective inventory to bring the defective inventory back into specification; an order to at least one of replace and supplement a defective component with another component; notifying an original maker of the defective component; notifying at least one fourth entity of the failure; an order to destroy the defective inventory; and an order to at least one of return and transport the defective inventory to another entity.

The method can further comprise triggering at least one further quality control event when the quality control data passes at least one of the quality control rules.

Another aspect of the specification provides a system for automatic quality, comprising: a first computing device associated with a first entity controlling production of a product, the first computing device enabled to determine quality control rules for producing the product; a second computing device associated with a second entity for maintaining quality control of the product, the second computing device enabled to maintain a database storing the quality control rules and receiving quality control data for comparison with the quality control rules to trigger at least one quality control event when the quality control data fails at least one of the quality control rules; and data collection devices at each of a plurality of production lines respectively associated with third entities, each of the data collection devices enabled to collect the quality control data for the product and transmit the quality control data to the second computing device.

At least one of the quality control rules can be normalized for a respective production line of the plurality of production lines by adjusting at least one of the quality control rules according to local data indicative of local conditions at the respective production line. The local data can comprise at least one of: a local production rate for producing the product at the respective production line; at least one setting at equipment for producing the product at the respective production line; and at least one condition particular to the respective production line.

The second computing device can be further enabled to adjust at least one of the quality control rules for a respective production line based on local data at the respective production line. At least one of the quality control rules can comprise at least one threshold value and the adjusting at least one of the quality control rules can comprise adjusting the threshold.

At least a portion of the data collection devices can be further enabled to collect local data indicative of local conditions at each of the plurality of production lines; and the second computing device can be further enabled to adjust the quality control rules for respective ones of the plurality of production lines based on the local data.

A first portion of the quality control rules can originate at computing devices associated with respective ones of the third entities, the first portion comprising local quality control rules for respective production lines.

At least a portion of the data collection devices can each comprise a mobile communication device for inputting the quality control data at electronic forms stored at the mobile communication device.

At least a portion of the data collection devices can each comprise an electronic data collection device for automatic collection of the quality control data. The electronic data collection device can comprise at least one: a camera; a colorimeter, an image recognition algorithm; a character recognition algorithm; a colour detecting algorithm; an RFID (radio frequency identification) device; an RFID sensor; a barcode reader; a weigh scale; a temperature sensor; a moisture sensor; a metal detector; a vibration sensor; a pressure sensor; a gas sensor; a chemical sensor; a biological element sensor; a laser beam based reading device; a laser beam based counting device; an optical reader device; an electrical measurement device; and a counting device.

The quality control rules can comprise thresholds such that a given quality control rule is failed when the quality control data does not meet a respective threshold and the given quality control rule is passed when the quality control data meets the respective threshold.

At least one quality control event can be triggered at a first one of the third entities based on given quality control data from a second one of the third entities failing the at least of the quality control rules.

The at least one quality control event can comprise at least one of: notifying the first entity of a failure of the quality control rules; notifying a respective one of the third entities associated with the failure; a recall order; a change in the quality control rules associated with at least one of the third entities; updating data collection parameters at the data collection devices; an order to quarantine inventory that does not meet the quality control rules; marking down a quality score of the respective one of the third entities associated with failure; a quality event associated with at least one of a supplier, a contract manufacturer and a contract packager; issuing a remedial action order to correct for the failure; an order to modify defective inventory to bring the defective inventory back into specification; an order to at least one of replace and supplement a defective component with another component; notifying an original maker of the defective component; notifying at least one fourth entity of the failure; an order to destroy the defective inventory; and an order to at least one of return and transport the defective inventory to another entity.

The second computing device can be further enabled to trigger at least one further quality control event when the quality control data passes at least one of the quality control rules.

A further aspect of the specification provides a computing device for automatic quality control, comprising: a processing unit and a communication interface, the processor enabled to: maintain a database storing quality control rules for producing a product, the quality control rules received from a remote computing device via the communication interface, the remote computing device associated with a first entity controlling production of the product, the product produced by a plurality of production lines respectively associated with second entities; receiving quality control data from data collection devices at each of the plurality of production lines, via the communication interface, the data collection device enabled to collect the quality control data for the product; and compare the quality control data with the quality control rules and trigger at least one quality control event when the quality control data fails at least one of the quality control rules.

BRIEF DESCRIPTIONS OF THE DRAWINGS

Implementations are described with reference to the following figures, in which:

FIG. 9 depicts an example Graphic User Interface for collecting quality control data, according to non-limiting implementations;

DETAILED DESCRIPTION OF THE IMPLEMENTATIONS

"Light manufacturing" activity performed by contract packagers and manufacturers differs from traditional manufacturers because:

a. the finished good varies widely in form factor and composition of subcomponents;

b. these variations occur on a regular basis, meaning some production lines only exist for a few hours; and c. the manufacturer did not design, and does not actually own or even make the components being used to assemble the finished product.

Because of this, the contract packaging and manufacturing activity is characterized as:

highly manual with minimal automation because of the rapid change and high variability of the products;

requiring frequent non-productive time for production line setup and tear down activities;

having to comply with many different quality standards beyond their control that are applied by the various owners and designers of the products they are manufacturing, and that differ depending on the product type (eg. pharmaceutical vs. food vs. electronics); and several different companies perform the same manufacturing activity even for the same finished good, and often share the same stock of raw materials or subcomponents Thus cost of quality control/conformance becomes higher, while the cost of failure of control remain unchanged, or possibly even greater with increasingly stringent regulations from governmental bodies like the FDA due to on-going product recall issues (food contamination, painted toys containing toxic substances, etc.).

The cost of failure of control can include but are not limited to internal failure costs and external failure costs. Internal failure costs can include but are not limited to:

1. scrap and therefore rework;
2. additional material costs;
3. carrying/overhead costs of safety inventory;
4. labor costs of performing the rework; and
5. overhead costs for extra time and administration.

External failure costs can include but are not limited to:

1. recall issues (eg. metal filings found in food product);
2. decreased sales from customer complaints (eg. products with improper taste/freshness);
3. service and support costs; and
4. brand erosion costs.

Figure 1:
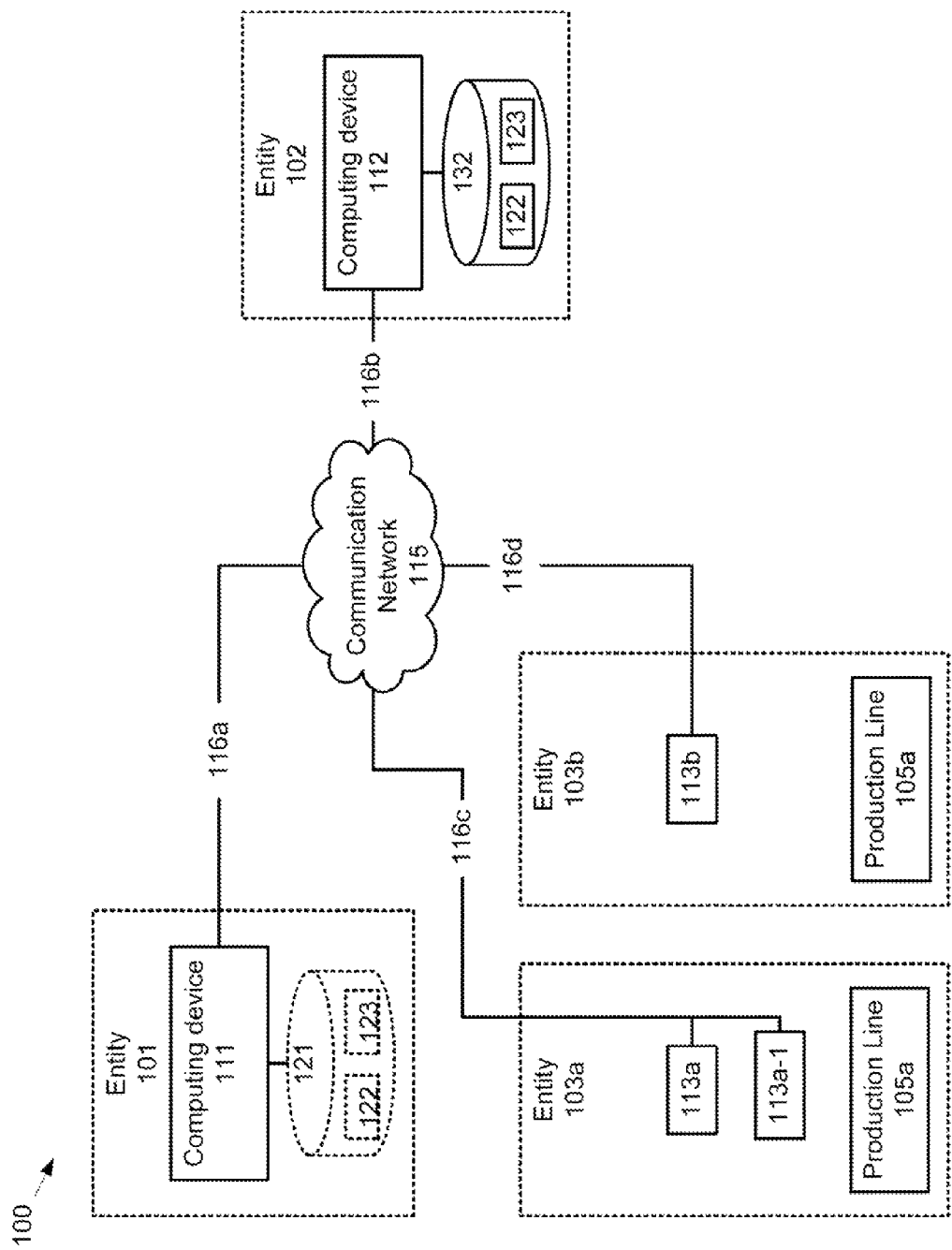
FIG. 1 depicts a system for automatic quality control using a plurality of computers, according to non-limiting implementations.

These issues are addressed in system 100, depicted in FIG. 1, system 100 for automatic quality control using a plurality of computers, according to non-limiting implementations. In present implementations, system 100 comprises a first entity 101, a second entity 102 and third entities 103a, 103b (collectively third entities 103, and generically a third entity; this nomenclature is used elsewhere herein). First entity 101 is associated with a product and desires to control production of the product. Furthermore, first entity 101 desires to outsource production of the product to third entities 103, each of which can produce the product by way of respective production lines 105. Hence, in some implementations, first entity 101 can comprise a brand owner and each of third entities 103 can comprise a contract manufacturer operating respective production lines 105 to produce the product for the brand owner. First entity 101 furthermore outsources automatic quality control of the product to second entity 102, as will be presently described.

System 50 further comprises at least one computing device 111 associated with first entity 101 and at least one computing device 112 associated with second entity 102. System further comprises at least one data collection device 113a, 113a-1 at entity 103a and at least one data collection device 113b at entity 103b each of data collection devices 113 enabled to collect data from respective production lines 105. Computing devices 111, 112 and data collection devices 113 will also be referred to herein as, respectively, device 111, device 112 and device 113.

Devices 111, 112 are in communication via a communication network 115 (also referred to herein as network 115) via links 116a, 116b. Further, data collection devices 113 are in communication with device 112 via network 115, or any other suitable network, via links 116c, 116d. Data can be exchanged between devices 111, 112, and between device 112 and devices 113 as desired, using any suitable combination of links 116 and network 115.

It is appreciated that the nature of network 115 and links 116 is not particularly limited and are, in general, based on any combination of architectures that will support interactions between devices 111, 112, and between device 112 and devices 113. In a present implementations network 115 can include the Internet and/or any suitable combination of wired and wireless networks. Each of links 116 can comprise any suitable combination of wired or wireless links as desired.

Figure 2:
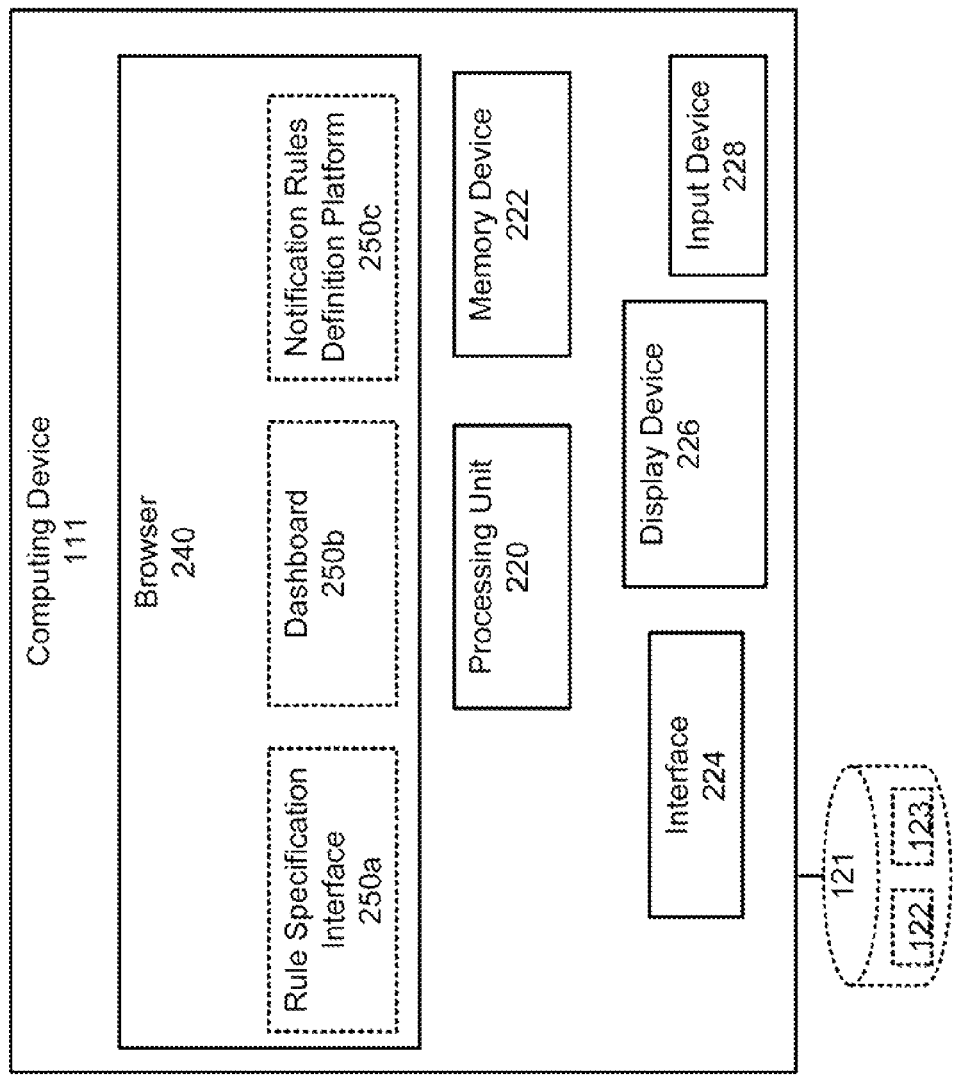
FIG. 2 depicts a computing device associated with a first entity of the system of FIG. 1, according to non-limiting implementations.

In some implementations, device 111 is further in communication with a database 121 for storing quality control rules 122 and/or quality control rule sets 123. Device 112 is in further communication with a database 132 for storing copies of quality control rules 122 and/or quality control rules sets 123, which can be received from device 111 in a provisioning process described below with reference to FIG. 6. As will be described below, in cloud computing environment and/or an SaaS (software as a service) environment, rules 122 and rule sets 123 are stored at database 132 and accessed by device 111 via network 115, Device 111 is now described with reference to FIG. 3, which depicts a schematic block diagram of the electronic components of device 111. It should be emphasized that the structure in FIG. 2 is an example. Device 111 includes a processing unit 220 interconnected with at least one memory device 222, a communication interface 224, a display device 226, and at least one input device 228.

Processing unit 220 comprises any suitable processor, or combination of processors, including but not limited to a microprocessor, a central processing unit (CPU) and the like. Other suitable processing units are within the scope of present implementations. Processing unit 220 will also be referred to hereafter as processor 220. Furthermore, processor 220 can be configured to execute different programming instructions that can be responsive to the input received via input device 226. To fulfill its programming functions, processor 220 is also configured to communicate with memory device 222. Programming instructions that implement the functional teachings of device 111 as described herein are typically maintained, persistently, memory device 222 and used by processor 220 which makes appropriate utilization of volatile storage in memory device 222 during the execution of such programming instructions, such as when processing browser application 140 and/or modules 250 described below.

Memory device 222, which will also be referred to hereafter as memory 222 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory 222 is enabled to store any suitable combination of applications and data for processing by processor 220, such as rule specification interface module 250a, a dashboard module 250b, a notification rules definition module 250c, all described below, or the like. It is appreciated that although browser application 240 and modules 250 are depicted in FIG. 2 as elements separate from processor 220 and memory 222, modules 250 can be implemented by storing modules 250 at memory 222 and processing modules 250 at processor 220.

Communication interface 224, also referred to hereafter as interface 224, comprises any suitable communication interface, or combination of communication interfaces. In particular communication interface 224 is enabled to communicate with network 115 via link 116a, network 115 being wired and/or wireless as desired. Accordingly, communication interface 224 is enabled to communicate according to any suitable protocol which is compatible with the network, including but not limited to wired protocols, USB (universal serial bus) protocols, serial cable protocols, wireless protocols, cell-phone protocols, wireless data protocols, Bluetooth protocols, NFC (near field communication) protocols and/or a combination, or the like. In some implementations, interface 224 can be enabled to communicate with remote computing devices (e.g. device 112, servers, other computing devices, mobile electronic devices, etc.), via any suitable communication network according to any suitable protocol, including but not limited to packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations.

Display device 226, also referred to hereafter as display 226, comprises any suitable one of or combination of CRT (cathode ray tube) and/or flat panel displays (e.g. LCD (liquid crystal display), plasma, OLED (organic light emitting diode), capacitive or resistive touchscreens, and the like).

Input device 228 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Device 111 is enabled to maintain or execute at least a web browser application 240. In some implementations, device 111 further comprises modules 250, however in a cloud computing environment, or the like, modules 250 are accessed at device 112, as will be described below. Accordingly, device 111 can be based on any computing environment that provides web browsing functionality and/or processing of modules 250. For example, such a computing environment can be based on an Intel™ or AMD™ or other microprocessor, with accompanying volatile storage (e.g. random access memory) and non-volatile storage (e.g. Flash, Hard disc drive), read only memory (ROM), network interface card(s), video cards that connect to one or more displays, a keyboard, a mouse (or other pointing device). Any operating system may be used, including, for example, an operating system offered by Microsoft™, or a Linux™ operating system, or an operating system offered by Apple Computer.

As referred to above, modules 250 can be stored at device 111, however in a cloud computing environment, modules 250 are accessible via browser 240. For example, in these implementations, modules 250 can be stored remotely, for example at device 112 and/or at an associated device, and accessed via browser 240 such that the functionality of modules 250 is provided at device 111 via browser 240.

In some implementations, device 111 is further appreciated to have access to database 121, which can be local or remote from device 111 as desired. For example, database 121 can be stored at memory 222. Alternatively, in a cloud computing environment, database 121 can be stored remotely and accessed via network 115, for example in database 132 accessible to device 112. In implementations where database 121 is stored remotely and modules 250 are accessed via browser 240, it is appreciated that device 111 need not be specially configured with modules 250 and database 121; rather the functionality of modules 240 and data stored at database 121 can be provided at device 111 via browser 240.

Figure 3:
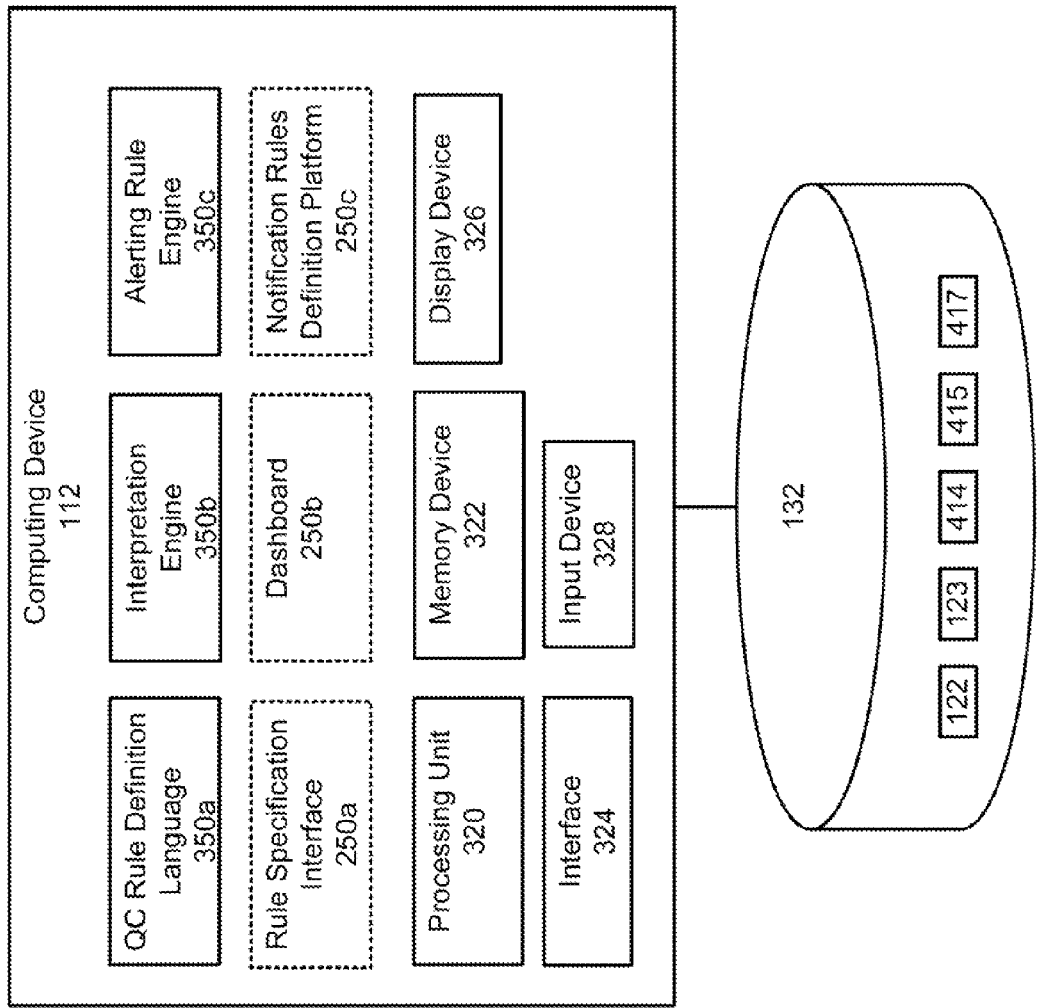
FIG. 3 depicts a computing device associated with a second entity of the system of FIG. 1, including modules for automatically controlling quality, according to non-limiting implementations.

Device 112 is now described with reference to FIG. 3, which depicts a schematic block diagram of the electronic components of device 112. It should be emphasized that the structure in FIG. 3 is an example. Device 112 includes a processing unit 320 interconnected with at least one memory device 322, a communication interface 324, a display device 326, and at least one input device 328. Processing unit 320 (also referred to processor 320), memory device 322 (also referred to processor 322), communication interface 324 (also referred to as interface 324), display device 326 (also referred to as display 326), input device 328 can each be respectively similar to processor 220, memory 222, interface 224, display 226 and input device 228, described above. Further, device 112 can be enabled to provide web based, cloud computing based services to device 111 and/or devices 113, for example by providing remote access to modules 250 which can be stored at device 112, as well as remote access to data in database 132. In these implementations, device 112 can comprise at least one server and/or server application.

In particular, when device 112 comprises at least one server, device 112 can be based on any well-known server environment including a module that houses one or more central processing units, volatile memory (e.g. random access memory), persistent memory (e.g. hard disk devices) and network interfaces to allow device 112 to communicate over network 115. For example, device 115 can be a ProLiant® Server from Hewlett-Packard Company, 3000 Hanover Street Palo Alto, Calif. 94304-1185 USA having a plurality of central processing units and having several gigabytes of random access memory. However, it is to be emphasized that this particular server is merely a non-limiting example, and a vast array of other types of computing environments for device 112 is contemplated. Furthermore, it is contemplated that device 112 may be implemented as a plurality of interconnected servers, in a so-called server farm, which are mirrored or otherwise configured for load balancing or failover or high availability or any or all of those.

Rule specification interface 250a is enabled for building rules 122 and/or rule sets 123. For example, rule specification interface 250a can be accessed from device 111 via browser 240 to specify and/or build rules such as those found in Table 1, described below. Hence, rule specification interface 250a can comprise a graphic user interface (GUI) for specifying and/or building quality control rule sets.

Dashboard module 250*b* is enabled to provide notifications in browser 240, For example, when notifications are to be provided to entity 101, dashboard module 250*b* provides indications of the notifications, such as indications of quality control failures, as described below.

Notification rules definition platform 250*c* is enabled for building notification rules, for example rules specifying when and/or who is to be notified in the event of a quality control failure.

In any event, device 112 further comprises a quality control rule definition language module 350*a*, an interpretation language module 350*b* and an alerting engine module 350*c*.

Quality control rule definition language module 350*a* comprises a business logic layer which formats rules 122 and/or rule sets 123 specified in the rule specification interface 250*a* GUI, and stores them in a suitable condition-action type format which can be processed by interpretation engine 350*b*. For example, rules 122 can have a format of <subject> <condition> <action>, a subject specifying an item, a condition specifying a condition of the item, and an action specifying an action to take when the subject meets the condition.

Interpretation engine 350*b* comprises a module which processes rules 122 and/or rule sets 123. For example, when a rule is received which is defined as <subject> <condition> <action> from sets of subjects, conditions and actions that are understood by the interpretation engine 350*b* (e.g. as compared against lists stored in database 132), then the action can be performed. Furthermore, it is appreciated that in some implementations, interpretation engine 350*b* can be enabled to format rules so that they are processable by devices 113, or any other suitable devices. In addition, interpretation engine 350*b* can interpret given rules for given devices 113. For example, when a device 113 comprises a camera and/or a colorimeter, a rule specifying a check performed by the camera/colorimeter (e.g. Rule 3 of Table 1, below) is formatted by interpretation engine 350*b* so that the rule can be processed by the camera/colorimeter.

Furthermore, it is appreciated that quality control rule definition language module 350*a* and/or interpretation engine 35*b* can be used to manage acceptable tolerances of quality control measurements, frequencies for checking or the like.

Altering rule engine 350*c* is enabled to compare quality control data 414 (described below, and which can be stored in database 132) collected at production lines 105 and compared to rules 122 for a given production line 105, and then notify suitable entities and/or computing devices associated with suitable entities of quality control failures.

In some implementations, suitable combinations of modules 350 can comprise an inference engine.

It is further appreciated that modules 250 and modules 350 can be used to build electronic forms 415 and/or quality control instructions 417 comprising programmable instructions on collecting quality control data, for example, a frequency for checking quality control data and the like. In a cloud computing environment, forms 415 and instructions 417 are stored in database 132 for access by devices 113, as will now be described. Furthermore, forms 415 can comprise web pages for viewing at a browser at a device 113.

Figure 4:
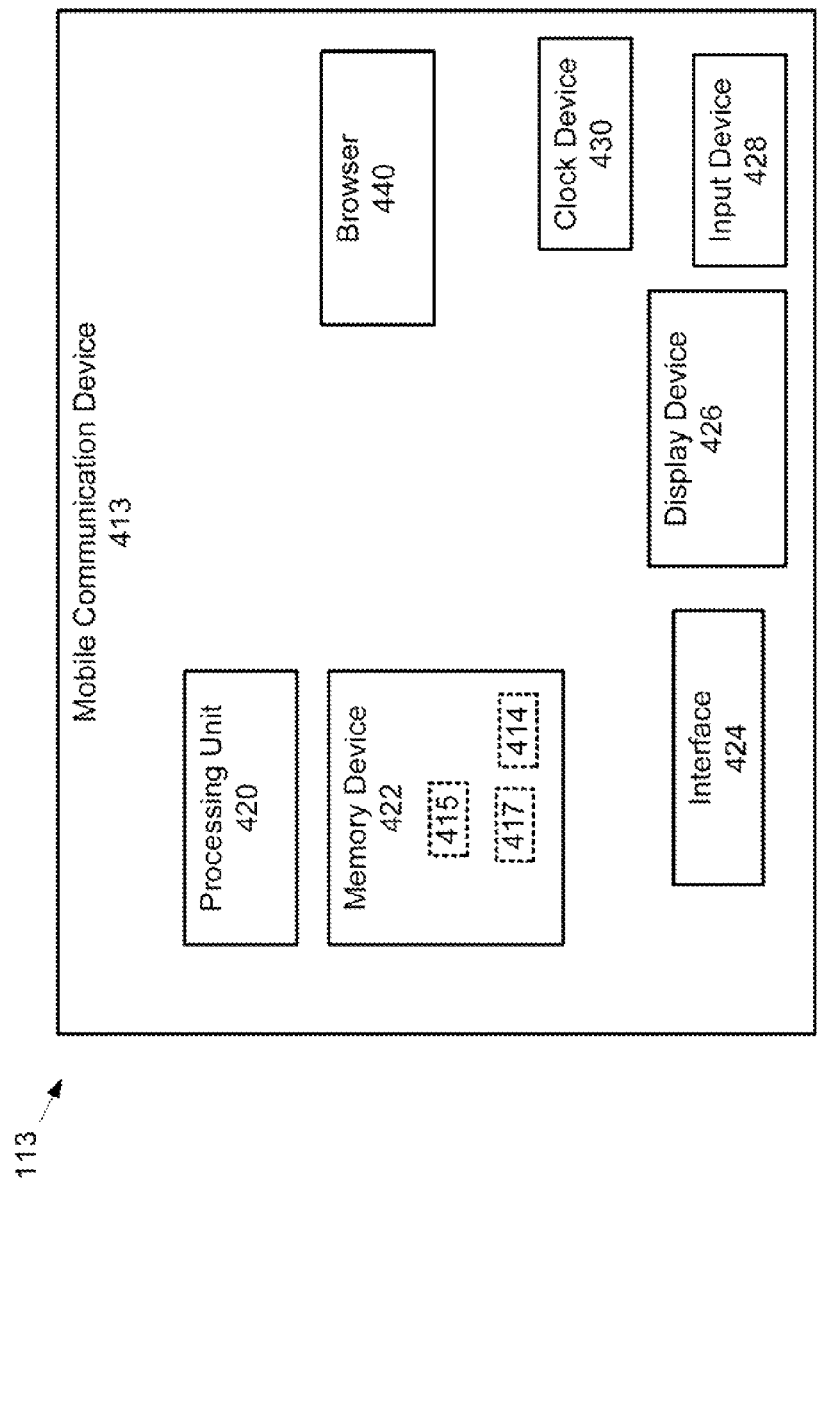
FIG. 4 depicts an example data collection device of the system of FIG. 1, according to non-limiting implementations.

Data collection devices 113 can comprise any suitable data collection devices enabled to collect quality control data from a respective production line 105. As depicted in FIG. 4, in particular non-limiting implementations, at least one data collection device 113 can comprise a mobile communication device 413 for inputting quality control data 414 at electronic forms 415, which can either be stored at mobile communication device 413 or, in a cloud computing environment accessed by mobile communication device 413 at device 112 via a browser 440, similar to the interaction between browser 240 and device 112. The frequency and/or order of input of data 414 can be controlled via instructions 417. For example, suitable forms 415 can be pushed to device 413 at a suitable time and/or frequency and/or in a suitable order by device 112 and/or device 413 can be programmed to retrieve suitable forms 415 at a suitable time and/or frequency and/or in a suitable order Mobile communication devices 413 comprise a processing unit 420 interconnected with at least one memory device 422, a communication interface 424, a display device 426 and at least one input device 428, and each can be respectively similar to processor 220, memory 222, interface 224, display 226 and input device 228 described above. However, it is appreciated that mobile communication device 413 comprise a portable electronic device, such as a PDA, tablet device, or any other suitable portable communication device, which is enabled to collect quality control data 414 via forms 415 and/or instructions 417 and transmit quality control data 414 to computing device 112 for analysis, as will be describe below. Further, it is appreciated that mobile communication devices 413 are enable to communicate wirelessly with computing device 112, and hence interface 424 comprises any suitable combination of wireless interfaces and in these implementations links 116*c, d* include a wireless link between mobile communication device 413 and network 115.

In some implementations, mobile communication device 413 can further comprise a clock device 430 such that times for collecting quality control data 414 can be determined according to instructions 417 and an appropriate portion of a form 415 provided at a suitable time.

However, in other implementations, at least one data collection device 113 can include, but are not limited to: a camera; a colorimeter, an image recognition algorithm; a character recognition algorithm (e.g. for detecting text and/or numbers); a colour detecting algorithm; an RFID (radio frequency identification) device; an RFID sensor; a barcode reader; a weigh scale; a temperature sensor; a moisture sensor; a metal detector; a vibration sensor; a pressure sensor; a gas sensor; a chemical sensor; a biological element sensor (e.g. sensors for sensors detecting presence of gases, chemicals, and/or biological elements); a laser beam based reading device (e.g. including but not limited to a laser based device for scanning/reading optical information such as a barcode and the like); a laser beam based counting device (e.g. including but not limited to a device including a laser beam that can be interrupted to count items); an optical reader device; an electrical measurement device (including but not limited to devices for measuring electric signals from a machine to determine, for example, a count of items via a voltage change and the like); and a counting device. In these implementations data collection device collects quality control data 414 from a respective production line 105, and either automatically or via a manual trigger transmits quality control data to device 112 for analysis. In some of these implementations, data collection device 113 can include a wireless interface for wireless transmission of data 414, while in other implementations, device 113 can include a wired interface for wired transmission of data 414. In yet further implementations, more than one data collection device 113 can be collecting quality control data 414 from a respective production line 105, with one device 113 acquiring data 414 (e.g. a camera, or the like, as described above) and another device 113 (such as mobile communication device 413) for transmitting data 414 to device 112.

It is yet further appreciated that each entity 103 can be associated with more than one device 113. For example, entity 103a comprises a data collection devices 113a, 113a-1, while entity 103b comprises data collection device 113b. For example, devices 113a, 113b can each comprise a mobile communication device 413, while device 113a-1 can comprise a camera device. Hence, entity 103a is enabled to collect quality control data via both devices 113a, 113a-1, while entity 103b is enabled to collect quality control data via device 113b.

Forms 415 and quality control instructions 417 can be configured via computing device 111 and/or computing device 112. For example, rule specification interface 250a can be used to create forms 415 and instructions 417, as well as quality control rules 122 and/or quality control rule set 123. For example, rule specification interface 250a can be used to create quality control rule sets 123, as will be presently described with reference to a non-limiting example for producing a product 500 depicted in FIG. 5.

To produce product 500, an electronics device 501 is packaged with a cable 503 and batteries 505 in a plastic blister pack 507 with special promotional graphics 509. It is appreciated that product 500 is a branded product associated with first entity 101 and that first entity 101 has contracted entities 103 to produce product 500 using respective production lines 105. Further, it is appreciated that each of electronics device 501, cable 503, batteries 505 and plastic blister pack 507 is provided to entities 103 as inventory and that entities 103 will package electronics device 501, cable 503, and batteries 505 into plastic blister pack 507 as the finished product 500. It is appreciated that product 500 is merely an example of a branded product and that any product producible at respective production lines 105 are within the scope of present implementations. It is further appreciated that inventory used to produce a given product come from any suitable source, for example a supplier and/or a plurality of suppliers. Furthermore, as will be described below, present implementations can be used to control quality of parts from suppliers and/or assign quality control ratings to suppliers. It is yet further appreciated that while the present example pertains to packaging a product, in other implementations, entities 103 can be manufacturing a product, packaging a product, assembling various products into a kit, or a combination thereof.

It is further appreciated that first entity 101 desires that quality control occur for product 500. Hence, using rules specification interface 250a, quality control rule sets 123 are defined for producing product 500. For example, table 1 provides a non-limiting example of a quality control rule set 123 for producing product 500:

TABLE 1

EXAMPLE QUALITY CONTROL RULE SET 123

| Rule # | Instruction | Threshold 1 | Threshold 2 | Frequency |
|---|---|---|---|---|
| 1 | Check that colour of logo is between threshold 1 and threshold 2 | 450 nm | 455 nm | Every 10 Units |
| 2 | Check that colour of logo matches logo sample | Visually Matches | N/A | Every 10 Units |
| 3 | Check that protective cap is present on end of cable | Present | N/A | Every 10 Units |
| 4 | Check serial code of device against provided list | Serial code in provided list | N/A | Every 60 mins. |
| 5 | Count items in sample blister pack | 4 | N/A | Every 30 mins. |
| 6 | Test blister pack glue strength | Stays closed when manually tested | N/A | Every 30 mins. |
| 7 | Count number of blister packs in shipping box | 12 | N/A | Every 60 mins. |

While table 1 is arranged in rows and columns, it is appreciated that table 1 can be stored in any suitable format. Further, it is appreciated that table 1 is merely an example of quality control data set 123 which relates specifically to production of product 500. Each row of table 1, after the header row, is indicative of a quality control rule. It is further appreciated that column "Rule #" is optional and is provided merely for reference. Indeed, any suitable reference number can be used to number a given quality control rule.

Further, each rule in data set 123 comprises an "Instruction" which comprises an instruction which can be provided as text in forms 415 and provided at mobile communication device 413.

Alternatively, "Instruction" can comprise an instruction which can be performed by a given device 113. For example, in Rule 1, "Check that colour of logo is between threshold 1 and threshold 2" as well as the associated thresholds, can be provided in a suitable format to a camera device at a given production line 105 such that the camera device is instructed to check the colour of a logo in special promotional graphics 509.

Each of "Threshold 1" and "Threshold 2" are indicative of optional thresholds which can be met for each given rule. For example, for Rule 1, the colour of the logo in special promotional graphics 509 is to be between a range of 450 nm (Threshold 1) and 455 nm (Threshold 2). Inside of this range, the colour of the logo in graphics 509 will pass Rule 1 and outside of this range, the colour of the logo in graphics 509 will fail Rule 1.

It is appreciated that not all quality control rules are associated with two thresholds. For example, Rule 5 to "Count items in sample blister pack" has a single threshold "4"; if the number of items in a sample blister pack is 4, then product 500 will pass Rule 5, and otherwise product 500 will fail Rule 5. A given threshold not being applicable to a respective rule is indicated by "N/A" in Table 1, however such an indication is generally appreciated to be non-limiting.

It is further appreciated that in some implementations, no thresholds are associated with a given rule, for example see Table 2 below.

Another non-limiting example of a quality control rule is to record information related to quality, including but not limited to an expiry date or serial code (e.g. as in Rule 4 of Table 1). Recording such data could also relate back to traceability of given inventory and/or given lots of inventory. In some of these implementations, a quality control rule is not associated with a given threshold as data is being entered into a field of a suitable form 415. For example, such a rule could specify that a serial code be entered at a given time and/or a given frequency. Such a rule could, specify, however that an empty field NOT be returned and/or that an empty field results in a quality control failure. In some of these implementations, when an empty field is returned in data 414, warnings can be issued to a device 113 which originates the data 414, indicating that the information should be entered. In a cloud computing environment, this can occur via a push of a form back to device 113.

However, a rule to enter a given serial code, or the like, could include a check of the oldest expiry date of all products in a variety pack.

Yet a further non-limiting example of a quality control rule is to check that recorded information related to quality conforms to a given format, for example a format for a given family of serial codes, lot codes or the like. When the format does not conform to a given format, warnings can be issued to a device 113 which originates the recorded information, indicating that the information should be re-entered.

In yet further implementations, interpretation engine 350b can be enabled to determine thresholds "on the fly" depending precedents and/or more important rules, e.g. when rules are further provided with a hierarchy, and/or more programming instructions. A non-limiting example of an advanced rule could comprise "The colorimeter should check the color to be between 48 nm and 50 nm, but if the average reading is 47 nm, then shift the range to be between 46 nm and 49 nm.". System 100 can be enabled to perform such an active feedback loop to determine that the difference is small enough that the additional cost of rejecting these defects might not be desirable from an overall business perspective, for example for economic reasons, based on the originally defined "unnecessarily stringent" tolerance.

Furthermore, interpretation engine 350c can be further enabled to assign rules based on cost. For example, the cost of quality enforcement can be high, as discussed below, and limits can be placed on the desired cost. For example, given quality control rules can be associated with a given cost and limit can be placed on the total cost. Hence, a given set of rules 122 can be generated such that the total cost is less than a given specified cost.

In some implementations, tolerances on thresholds are also provided, however in other implementations, tolerances on measurements can be provided via quality control rule definition language module 350a and/or interpretation engine 350b, for example via an interaction with each module 350a, 350b via browser 240.

In the column labelled "Frequency", a frequency that the associated rule is to be checked is applied. For example, Rule 1 is to be applied to "Every 10 Units" while Rule 7 is to be applied every 60 minutes. Hence, it is appreciated that the frequency that a given rule is to be applied can be expressed in any suitable format and in suitable units (i.e. checks per unit of time, checks per number of units produced or the like).

From a comparison of Rule 1 and Rule 2, it is appreciated that both Rule 1 and Rule 2 are quality control rules for checking the colour of the logo in graphics 509. However, in Rule 1, it is presumed that an entity 103 can measure colour (e.g. using a camera device and/or a colorimeter), while in Rule 1 it is presumed that an entity 103 has been provided with a sample logo against which the logo in graphics 509 can be visually compared. Hence, quality control rule set 123 can account for differences in quality control data collection capability at different entities 103. Furthermore, as will be described below, different subsets of quality control rule sets 123 can be provided to different entities 103 as quality control rules 122 based on their respective capabilities. As will further be described below, a given rule and/or quality control rules 122 can be further normalized based on local data associated with a respective entity 103. Similarly, a given rule and/or quality control rules 122 can be dynamically adjusted based on local data associated with a respective entity 103.

Figure 6:
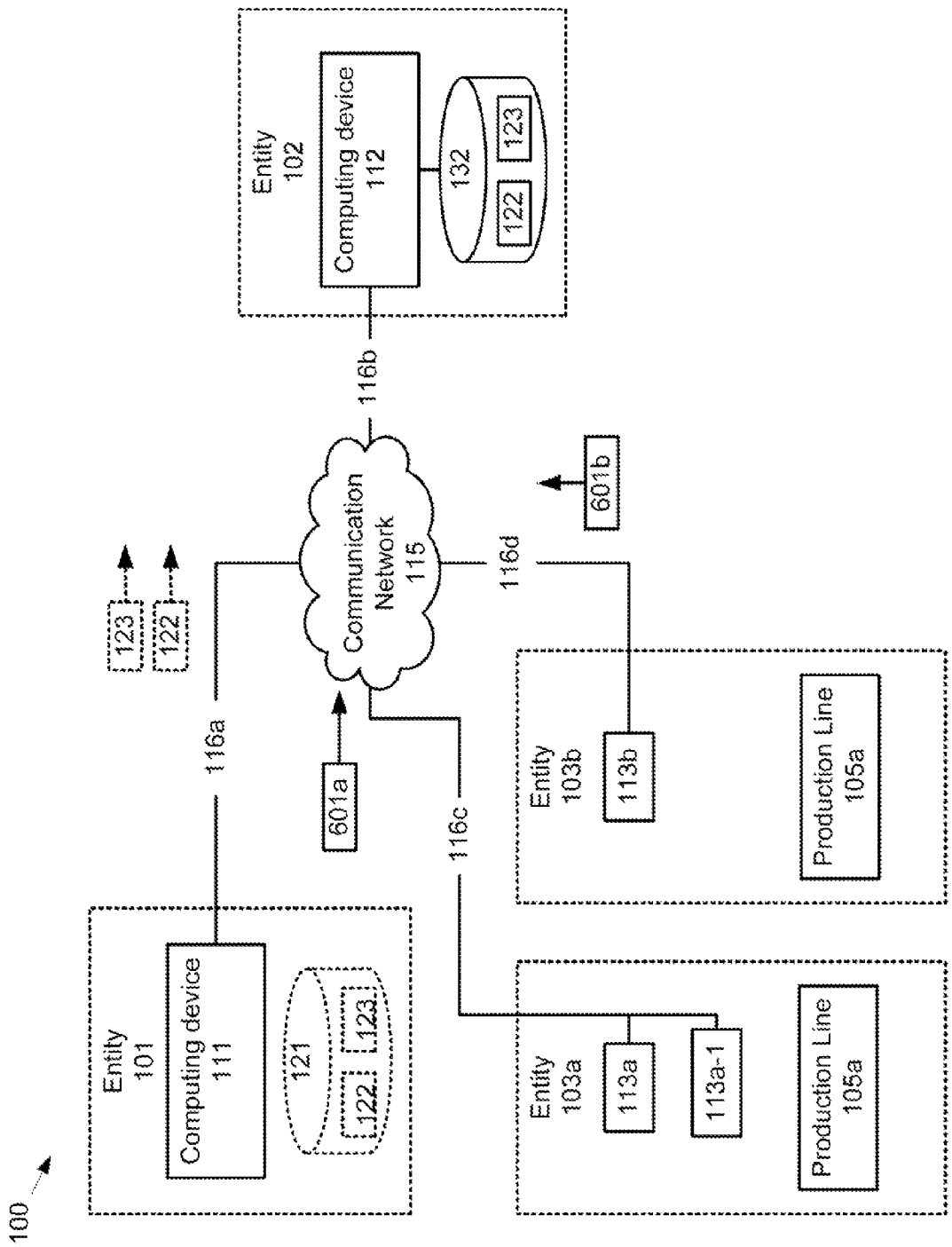
FIGS. 6 to 8 depict the system of FIG. 1 performing various quality control functions, according to non-limiting implementations.
Figure 7:
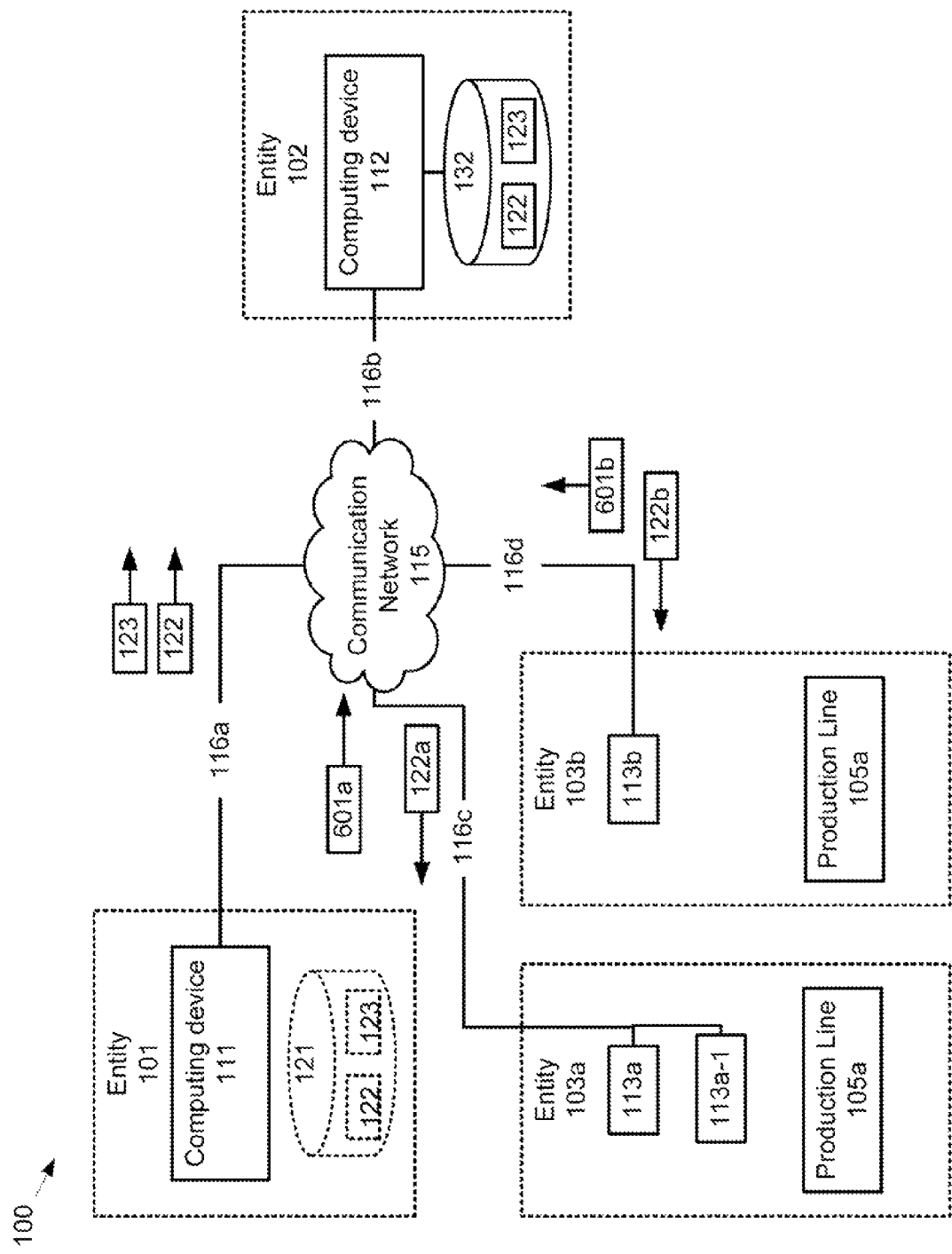

It is appreciated that rule sets 123 and/or rules 122 can be developed via interaction with rules specification interface 250a and/or browser 240. It is further appreciated that in implementations where modules 250 are located at device 111, rule sets 123 and/or rules 122 are provided to computing device 112, for example via links 116 and network 115 for storage in database 132, as depicted in FIG. 6, which is substantially similar to FIG. 1, with like elements having like numbers. While FIG. 6 depicts device 111 transmitting rule sets 123 and/or rules 122 to device 112, it is appreciated that in cloud computing environments device 111 accesses rule specification interface 250a view browser 240, rule sets 123 and/or rules 122 are received at device 112 via browser 240 as each rule is developed and specified.

It is further appreciated that while rule sets 123 and rules 122 are depicted as being separate elements in the figures, in some implementations rules 122 can be designated as a subset of rules sets 123 using flags in rule sets 123. For example in Table 1, Rules 1, 2, and 4 to 7 can be designated as rules 122a for entities 103 that have a camera device and/or colorimeter for electronically measuring colour. In FIG. 6 it is presumed that entity 103a is an entity enabled to measure colour electronically. Similarly, Rules 1, and 3 to 7 can be designated as rules 122b for entities 103 that check colour of logo in graphic 509 through a visual comparison with a sample logo provided to such entities 103 by entity 101. In FIG. 6 it is presumed that entity 103b is an entity where such a visual comparison occurs rather than an electronic inspection.

With further reference to FIG. 6, device 112 can process rule sets 123 and/or rules 122 according to local data 601 associated with each respective entity 103.

For example, as depicted in FIG. 6, each entity 103 can transmit respective local data 601 (e.g. entity 103a transmits data 601a and entity 103b transmits data 601b) to computing device 112 via network 115 and any appropriate link such as links 116c, d or the like. Further, it is appreciated that data 601 originates from any suitable combination of communication devices associated with respective entities 103. For example, in addition to device 113, each entity 103 can comprise a suitable computing device (not depicted) for interacting with device 112. In these implementations, the respective computing devices can be enabled to provide local data 601 to device 112, for example via a browser application and/or a web interface similar to that described above with respect to browser 240 and device 111.

A non-limiting example of local data 601 can include additional rules local to a respective production line 105. For example, while quality control rules in table 1 are particular to the final state of product 500, an entity 103 contracted to produce product 500 can desire to include further quality control rules related to conditions at a respective production line 105. Hence, with respect to entity 103a, which is assumed in these examples to have a production line 105a that comprises a conveyor belt, examples of such a further quality control rules that can be provided in local data 601a are provided in Table 2:

TABLE 2

EXAMPLE ADDITIONAL QUALITY CONTROL RULES
FOR AN ENTITY 103a

| Rule # | Instruction | Threshold 1 | Threshold 2 | Frequency |
|---|---|---|---|---|
| 1 | Clear conveyor belt of previous product | N/A | N/A | Before each production run |
| 2 | Perform calibration of colorimeter | N/A | N/A | Before production run and then Every 60 mins. |

Table 2 is similar to table 1 as describe above, however rules in table 2 are local to entity 103a. For example, as production line 105a includes a conveyor belt and entity 103a has quality control Rule 1 to ensure that the conveyor belt is clear of previous product. While Rule 1 is important to entity 103a as a contracting manufacturer, entity 101 as the brand owner has no need to set Rule 1; indeed, entity 101 may have no knowledge of specifics of production line 105a and assumes that entity 103a will take precautions to prevent cross-contamination of product 500 with other product produced by entity 102.

Similarly, Rule 2 is particular to entity 103a which performs colour checks using a colorimeter (e.g. device 113a-1).

Local data 601b can hence include a list of quality control rules particular to entity 103b, for example a rule to generically "Remove previous product" prior to each production run. For example assuming entity 103a has a conveyor belt in production line 105a, and entity 103b does not have a conveyor belt, but rather manually transports components for producing product 500 between tables where different tasks are performed, then a Rule to clear a conveyor belt, as in Table 2, would be irrelevant to production line 105b. While such a rule to clear a conveyor belt could be set by entity 101 in Table 1, such a rule could never be met by production line 105b and/or would filtered out of rules 122b.

Further non-limiting examples of local data 601 can comprise production rates. For example, due to the conveyor belt, production line 105a can have a production rate that is larger than production line 105b. In specific non-limiting examples, it is assumed that the production rate of production line 105a is twice as fast as the production rate of production line 105b (e.g. 100 units per hour for production line 105a and 50 units for hour for entity production line 105b). Hence, local data 601a comprises a production rate of 100 units per hour and local data 601b comprises a production rate of 50 units per hour.

Yet a further non-limiting example of local data 601 can comprise a list of devices 113 associated with a given entity 103. For example, local data 601a can include indications that device 113a (i.e. a mobile computing device 413) and device 113a-1 (i.e. a device for electronically measuring colour, such as a camera and/or a colorimeter) is at production line 105a. Similarly local data 601b can include an indication of device 113b.

In any event, local data 601 is provided to computing device 112 which can then produce respective rules 122a, 122b by processing rule sets 123 and/or rules 122 and/or local data 601.

Furthermore, device 112 is enabled to normalize rules 122 based on local data 601 associated with each respective entity 103. For example, consider that production line 105a is appreciated to have a production rate that is twice that of production line 105b. Hence, in order to maintain similar quality standards between production lines 105, the frequency of temporal checks in quality control rules for production line 105a can be doubled, as described below with reference to Table 3.

In another non-limiting example of normalization, tolerances on threshold values can be adjusted based on local data. For example, in implementations where a product is being produced that requires filling different size bottles with a liquid using respective nozzles at each respective production line 105 (e.g. the production lines have been reconfigured to produce bottles of shampoo), the tolerance can be normalized based on the size of the bottles being filled, a size and/or type of nozzle, or the like.

Indeed, it is appreciated that other types of normalization of rules 122 are within the scope of present implementations.

Further, quality control data from local data 601 can be incorporated into respective rules 122a, 122b. For example Table 3 depicts a rule set 122a associated with entity 103a and/or associated devices 113:

TABLE 3

EXAMPLE QUALITY CONTROL RULE 122a

| Rule # | Instruction | Threshold 1 | Threshold 2 | Frequency |
|---|---|---|---|---|
| 1 | Clear conveyor belt of previous product | N/A | N/A | Before each production run |
| 2 | Perform calibration of colorimeter | N/A | N/A | Before production run and then Every 30 mins. |
| 3 | Check that colour of logo is between threshold 1 and threshold 2 | 450 nm | 455 nm | Every 10 Units |
| 4 | Check Cable Length | 0.9 Meter | 1.0 Meter | Every 10 Units |
| 5 | Check serial code of device against provided list | Serial code in provided list | N/A | Every 30 mins. |
| 6 | Count items in sample blister pack | 4 | N/A | Every 15 mins. |
| 7 | Test blister pack glue strength | Stays closed when manually tested | N/A | Every 15 mins. |
| 8 | Count number of blister packs in shipping box | 12 | N/A | Every 30 mins. |

It is appreciated that Table 3 is similar to Table 1, with Rule 3 of Table 1, omitted. Further, the remaining rules are adjusted based on production rates provided in local data 601 to ensure that the quality control checks that are performed at production line 105a will be similar to the quality control checks performed at production line 105b such that a similar amount of product is checked at each production line. Hence, while Rule 5 of Table 1 is to be performed every 30 minutes according to Table 1, in Table 3 the equivalent rule 6 is performed every 15 minutes to take into account the relative difference in production rates between production lines 105.

Further Table 2 is now incorporated into Table 3 as Rules 1 and 2 as each of these rules are to be performed prior to a production run.

Hence, in general, it is appreciated that Table 3 represents a list of quality control rules 122a provided to entity 103a to control quality control of product 500 on production line 105a.

However, it is further appreciated that in some implementations, the threshold values need not be included in data 122a as the test for whether or not a particular quality control rule has been failed is performed at device 112, as will be described below.

Similarly, Table 4 can be provided to entity 103b as rules 122b:

TABLE 4

EXAMPLE QUALITY CONTROL RULE 122b

| Rule # | Instruction | Threshold 1 | Threshold 2 | Frequency |
|---|---|---|---|---|
| 1 | Clear previous product | N/A | N/A | Before each production run |
| 2 | Check that colour of logo matches logo sample | Visually Matches | N/A | Every 10 Units |
| 3 | Check Cable Length | 0.9 Meter | 1.0 Meter | Every 10 Units |
| 4 | Check serial code of device against provided list | Serial code in provided list | N/A | Every 60 mins. |
| 5 | Count items in sample blister pack | 4 | N/A | Every 30 mins. |
| 6 | Test blister pack glue strength | Stays closed when manually tested | N/A | Every 30 mins. |
| 7 | Count number of blister packs in shipping box | 12 | N/A | Every 60 mins. |

It is appreciated that Table 4 is similar to Table 1, however with a new Rule 1 inserted to "Clear previous product", "Before each production run", as described above. In addition, the frequency of checks is not adjusted as the rules in Table 4 are not normalized, but rather act as the data set against which data 122a is normalized.

In any event, it is appreciated that Table 4 represents a list of quality control rules 122b provided to entity 103b to control quality control of product 500 on production line 105b, and that the two data sets 122a, 122b are normalized.

It is yet further appreciated that in some implementations, device 112 does not perform such normalization. Rather rules 122a, 122b are respectively associated with entities 103a, 103b as subsets of rule sets 123. Similarly, in some implementations, rules 122a, 122b are not adjusted according to local data 601, and indeed in these implementations local data 601 may not be provided to device 112.

Rules 122a, 122b can be further used to populate forms 415 and/or instructions 417. In some implementations Rules 122a, 122b can comprise forms 415 and/or instructions 417: for example rule sets 123 and/or rules 122 and/or rules 122a, 122b can be generated as items that can be used to populate forms 415 and/or instructions and provided to respective entities as rules 122a, 122b.

It is further appreciated that, in some implementations, forms 415 and/or instructions 417 can be provided to respective devices 113, such that the forms 415 and/or instructions 417 are processed by and remotely available to devices 113. However, in a cloud computing environment, forms 415 and/or instructions 417 are accessed by devices 113 via browser 440.

Figure 8:
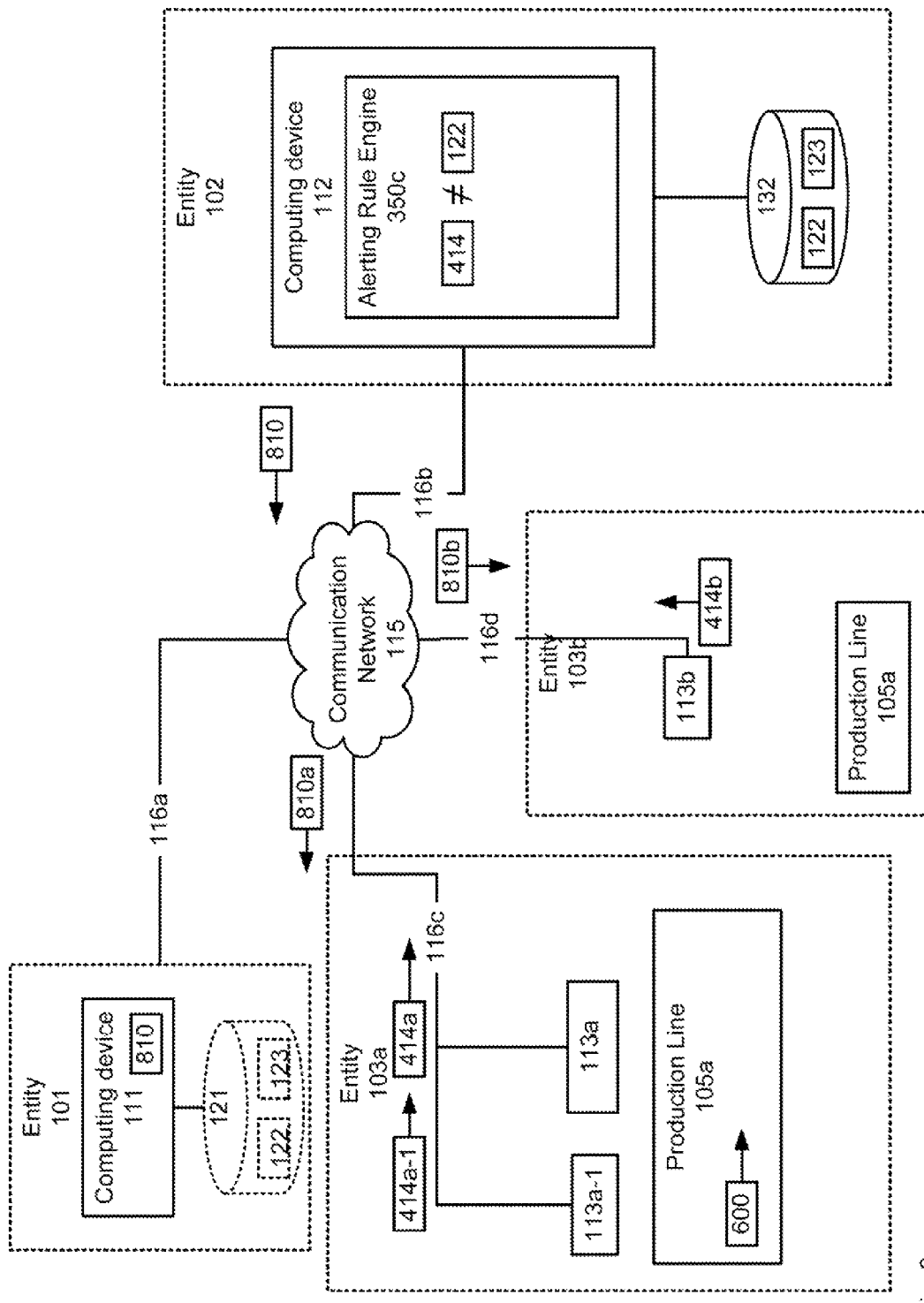

Attention is directed to FIG. 8 which is substantially similar to FIG. 1, with like elements having like numbers, however elements of entity 103a and alerting rule engine 350c have been emphasized to illustrate certain aspects of certain implementations, as will now presently be described. Specifically, it is appreciated that as product 500 advances along production line 105a, devices 113a are instructed to provide portions of forms 415 at times determined by clock device 430 and/or local data collected from production line 105a such that quality control checks defined according to the rules in Table 3 are performed in timely fashion.

For example, attention is directed to FIG. 9 which provided a non-limiting example of a portion of a forms 415 provided in a Graphic User Interface (GUI) 900 at display 426 of device 113a (i.e. a mobile communication device 415) provided to collect quality control data 414a from device 113a. It is appreciated that as the production run is not started, GUI 900 is prompting confirmation of Rules 1 and 2 of Table 3. While GUI 900 depicts radio control buttons for indicating whether or not certain conditions have occurred, it is appreciated that the format and/or controls of GUI 900 are not to be considered particularly limiting and that any suitable format and/or controls are within the scope of present implementations. For example, GUI 900 can include any suitable combination of radio control buttons, checkboxes, data entry fields (e.g. for receiving text data), or the like.

Furthermore, quality control data 114a-1 can be collected either automatically by device 113a-1 or under manual operation of device 113a-1.

Once, data 414 is collected, data 414 can be transmitted to device 112, by either device 113a and/or device 113a-1 for processing using alerting rule engine 350c and as will now be described with reference to FIG. 10.

Figure 10:
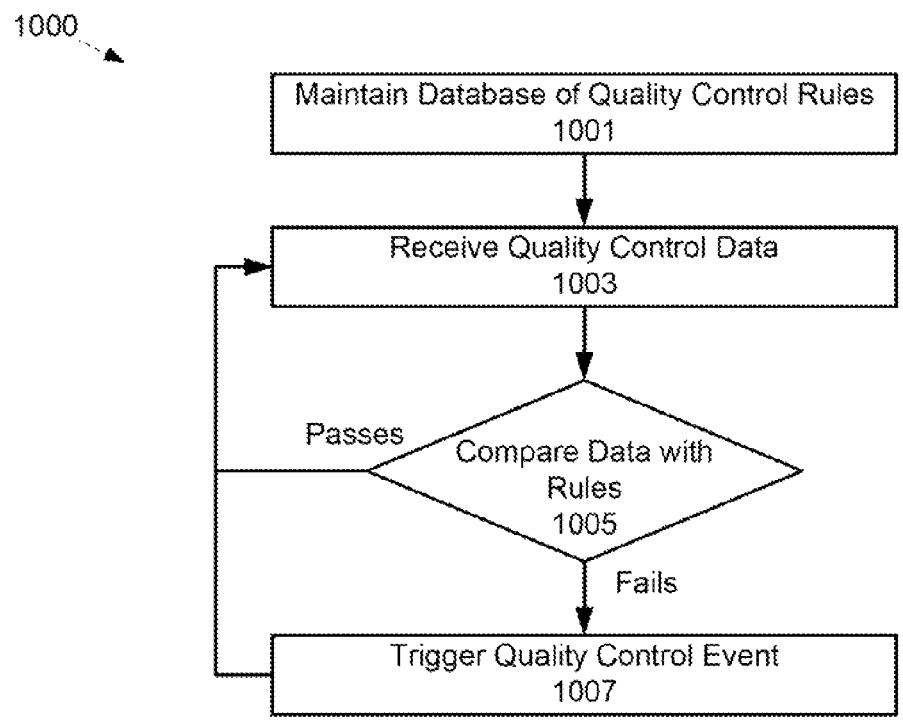
FIG. 10 depicts a method for automatic quality control using a plurality of computers, according to non-limiting implementations; and, FIG. 11 depicts the system of FIG. 1 performing various quality control functions, according to non-limiting implementations.

Attention is now directed to FIG. 10 which depicts a method 1000 for automatic quality control using a plurality of computers. In order to assist in the explanation of method 1000, it will be assumed that method 1000 is performed using system 100. Furthermore, the following discussion of method 1000 will lead to a further understanding of system 100 and its various components. However, it is to be understood that system 100 and/or method 1000 can be varied, and need not work exactly as discussed herein in conjunction with each other, and that such variations are within the scope of present implementations.

It is further appreciated that method 1000 is performed by device 112, for example by processing modules 350.

At block 1001, database 132 for storing quality control rules 122 for producing product 500 is maintained, as described above. It is further appreciated that database 132 is maintained by device 112 associated with second entity 112 which has been contracted for maintaining quality control of product 500. It is yet further appreciated that product 500 is being produced by a plurality of production lines 105 associated with respective third entities 103.

At block 1003, quality control data 414 is received from data collection devices 113 at each of the plurality of production lines 105, each of the data collection devices 113 enabled to collect quality control data 114 for product 500. For example, as depicted in FIG. 8 quality control data 414a is received from device 113a and quality control data 414a-1 is received from device 113a-1 associated with production line 105a, while quality control data 414b is received from device 113b associated with production line 105b. It is appreciated, that data 414 can be transmitted to device 112 whenever a new set of data is collected via a device 113. Alternatively, data 414 can be collected for a given period of time and transmitted to device 112 periodically. However, as can be appreciated, the more frequent the transmission of data 414, the more quality control becomes a "real-time" process.

Returning to FIG. 10, at block 1005, quality control data 414 is compared with quality control rules 122, at device 112, for each respective production line 105. For example, data 414a and data 414a-1 are compared to rules 122a, and data 114b is compared to rules 122b. The comparison can occur via alerting rule engine 350c, as depicted in FIG. 8. Furthermore, in some implementations, quality control data 414 is stored at database 132.

When data 414 meets the criteria in rules 122 (e.g. data has been collected, thresholds are met within given tolerances etc., in accordance with the rules as described above), then further quality control data 414 is received at block 1003.

However, when data 414 fails to meet criteria in rules 122, at block 1007, alerting engine 350 triggers at least one quality control event. For example, a notification 810 of a quality control event failure can be provided to device via dashboard module 250b. In some implementations, notification 810 is transmitted via network 810 for processing by device 111, while in other implementations, transmittal of notification 810 occurs via access of dashboard application 250b at device 112 via browser 240. In some implementations, the type of notification 810 and/or when and/or where notification 810 is transmitted is determined by notification rules specification platform 250c.

Alternatively, in some implementations, method 1000 can further comprising triggering at least one further quality control event when quality control data 414 passes at least one of quality control rules 122. In other words, between block 1005 and block 1003, can be a block similar to block 1007 pertaining, however, to passing a rule 122 rather than failing a rule 122. An example of a quality control event that occurs upon passing a rule 122 could be a notification to entity 101 and/or an associated computing device, indicating that the rule 122 has been passed. Other quality control events that occur upon passing a rule 122 are within the scope of present implementations.

In yet further implementations, notification 810 can be provided to at least one entity 113. For example, returning to the example product 600, alerting rule engine 350c can determine from data 113a-1 that the colour of logo in graphic 509 fails Rule 3 of Table 3, (i.e. the colour of the logo is outside of the specified range logo and is hence the wrong colour). Hence, a notification 810a can be provided to entity 113a indicating that the inventory of blister packs 507 is to be quarantined. If a serial and/or lot number is provided in data 113a-1, then notification 810a can indicate that blister packs in that lot number is to be quarantined. Further, another notification 810b can be provided to entity 113b indicating that the frequency of quality control checks on the colour of logo in graphic 509 is to be increased and/or that blister packs 507 in the serial and/or lot number are to be quarantined. A further notification can be sent to a supplier of blister packs 507. When the frequency of quality control checks is changed, it is appreciated that the associated rule is updated at the appropriate device 810. In other words, a quality control feedback loop is implemented, not only for a given production line 105 where the failure occurred, but for other production lines 105. Hence, even though production of product 600 is being performed at different production lines 105, uniform quality control rules can be applied across all the production lines, with data 113a from a first production line 105a feeding back into second production line 105b.

Non-limiting examples of at least one quality control event can hence comprise at least one of: notifying first entity 101 of a failure of quality control rules; notifying a respective one of third entities 103 associated with the failure; a recall order; a change in quality control rules associated with at least one of third entities 103; updating data collection parameters at data collection devices 113; an order to quarantine inventory that does not meet quality control rules; marking down a quality score of respective one of third entities 103 associated with the failure; and issuing a remedial action order to correct for the failure. Other examples of quality control events are within the scope of present implementations. Other examples include, but are not limited to: an order to modify defective inventory in some fashion (e.g. to make it acceptable again and/or bring the defective inventory back into specification, such as replacing the logo/graphics 509 on blister packs 507 with a new logo/graphic 509); an order to replace and/or supplement a defective component with another component; notifying an original maker of the defective component of the issue; notifying a fourth entity of the failure (e.g. the original maker, or the like); an order to destroy defective inventory; and an order to return/transport defective inventory to another entity, such as repair shop or a recycling facility.

It is appreciated that issuing a recall order can occur when product that has failed a quality control rule at one production line 105 has already been shipped at another production line. For example, returning to the example of a logo in graphic 509 being the wrong colour, when the problem with the colour is determined at a first production line 105, it can be determined that blister packs 507 of the same serial code family have already been shipped from another production line 105. Hence, the recall order can be triggered based on the problem found at the first production line 105.

Alternatively, if product has not been shipped and/or it is determined that existing inventory has a similar serial code as the inventory and/or product which failed the quality control rule, an order to quarantine inventory and/or product having similar serial codes can be issued.

In some manufacturing environments, contract manufacturers are provided with a quality score. Hence, in these environments, the failure can trigger marking down a quality score of respective one of third entities 103 associated with the failure. Such a markdown can trigger further remedial action, such as adjusting quality control rules 122 for the given entity 103 (e.g. tightening thresholds, tolerances and/or increasing frequency of quality control checks).

Furthermore, a quality control failure of given inventory can be further used to rate a supplier of parts/inventory and/or issue warnings, notifications and the like to suppliers via notifications similar to notifications 810 and/or by notifying entity 101 who will in turn notify the supplier(s).

Figure 11:
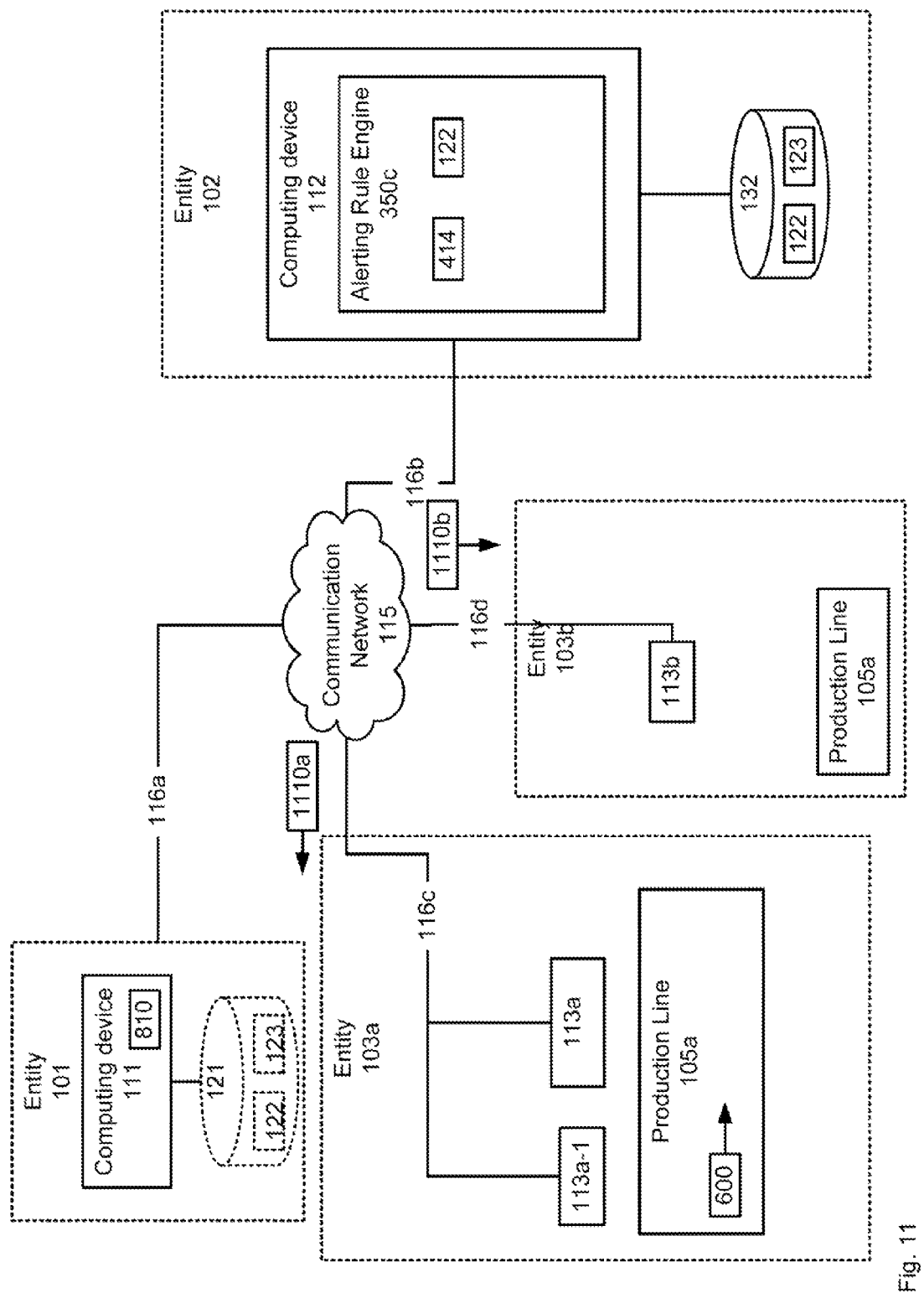

With regard to a change in quality control rules associated with at least one of third entities 103, when a quality control rule 122 has been failed, rules 122, 122a and/or 122b can be updated to be more stringent and/or to be more frequent. For example, a given rules can be changed from checking 1 in 10 products to checking 1 in 5 products. Alternatively, threshold values and/or tolerances could be changed (e.g. made smaller). Such a change can be implemented either by including a command to update a given rule in notification 810a and/or 810b, and/or by issuing separate commands 1110, as in FIG. 11 to update data collection parameters at devices 113, such as changing forms 415 and/or instructions 417.

Furthermore, it is appreciated that at least one quality control event can triggered at a first one of the third entities 103 based on given quality control data 414 from a second one of the third entities 103 indicating failure of at least one of the quality control rules 122, as described above.

Indeed, it is appreciated that issuing any suitable remedial action order to correct for the failure is within the scope of present implementations. For example a notification can be sent to a supplier of blister packs 507.

In some implementations, method 1000 can further include adjusting at least one of quality control rules 122 for a respective production line 105 based on local data 601 at the respective production line 105. For example, adjusting at least one of quality control rules can comprise adjusting a threshold and/or adjusting a frequency for applying the quality control rule, as described above with regard to normalizing quality control rules between production lines 105.

In some implementations, method 1000 can be understood as a feedback loop for controlling quality across a plurality of production lines. For example, block 1007 can return to block 1003. Furthermore, a quality control event triggered at block 1007 can include triggering an event at a second production line 105 based on a failure at a first production line 105. Hence, despite the same product being manufactured at different production lines, a uniform quality standard can be applied to the product.

Such a feedback loop can further be applied to normalizing quality during a production run as local data 601 evolves. For example, consider a given production line 105 with a three day production run in which the production rate increases each day (e.g. the workers become more efficient as they learn how to manufacture a product). Local data 601, such as production rate, can be collected periodically and transmitted to device 112, which in turn causes the quality control rules 122 to be adjusted "on-the-fly" based on local data 601. For example, as the production rate increases, the frequency of quality checks can be increased (e.g. by updating instructions 417 by transmitting updated commands to device(s) 113) accordingly. Similarly, when production rate decreases, the frequency of quality checks can be decreased accordingly.

Various advantages will now be apparent. For example, by using devices 113 to perform quality checks electronically, and by implementing an automated notification system that allows response to dips in quality with remedial action before further quality issues are encountered, costs are reduced for: scrap, rework (both materials and labour), additional materials costs, inventory overhead, overhead for extra time and administration, recall costs, decreased sales due brand erosion from poor product, service and support. Further, costs are further reduced by implementing a quality feedback loop across remote production lines, such that quality control failures at one production line can be fed back into other production lines.

In other words, present implementations, results in reducing the cost of quality in a network of manufacturing suppliers, each using a different process to produce the same finished good (i.e. product). Such advantages become further apparent in light of the following equations:

$$DC = x \sum_{x=i}^{C} \left( \frac{\frac{D!}{(D-x)!} \frac{(P-D)!}{(P-D-(C-x))!}}{\frac{P!}{(P-C)!}} \right)$$

$$DF = x \sum_{x=i}^{C} \left( \frac{\frac{D!}{(D-x)!} \frac{(P-D)!}{(P-D-(C-x))!}}{\frac{P!}{(P-C)!}} \right) PS$$

where:
D=Number of defects that existed in a given production run;
C=Number of checks performed in the given production run;
P=Number of units produced in the given production run;
DC=Average number of checks that are actually done upon a unit with a defect in it in the given production run;
PS=Probability that a check performed on a defective unit will actually find the defect; and
DF=Average number of defects found in the production run.

From these equations it is appreciated that as the number of checks C increases, the number of defects found, DF, increases. Further, as the number of units produced P increases, or similarly, the rate of production increases, a greater number of defects D are produced, and checks C need to increase accordingly.

However there is also a cost to performing checks. The Cost of Quality (CoQ) includes both "appraisal costs" and "failure costs". Appraisal costs include the cost to perform an inspection whether they are machine setup and operating costs, and/or labour costs for manual inspections. Failure costs range widely from "internal failure costs" such as the costs to produce another unit that is not defective (e.g. replacement materials, overhead, and labour) and "external failure costs" when a defect is not caught before it is released from manufacturing (e.g. recall costs, customer satisfaction, regulatory compliance costs).

Because production rates, machine types and efficiencies, labour rates and skill levels, and other conditions vary across companies the optimal approach to maximizing quality while minimizing costs is different in each environment.

Present implementations reduce such costs across the different manufacturing processes used at different contract manufacturing and/or packaging companies—even if it is for producing the same finished good/product due the automation of the collection of quality check information, which is processed this through alerting rule engine 350*c* enabled to respond automatically in real-time to changing results of quality check procedures across different production lines, thereby improving the quality of finished goods.

Hence, by applying present implementations in a distributed manufacturing environment various advantages are evident, even in extraordinarily short production run durations (not uncommonly only a few hours) where it is otherwise very hard to track the relevant information accurately, let alone respond to it in time to make adjustments accordingly:

1. As the manufacturing processes and rates will be different at each environment/production line, to properly ensure consistent quality, quality standards can be enforced differently both by adjusting the number and type of quality control rules for each line and by normalizing rules across different lines;

2. As the cost of ensuring product quality will vary in each environment, the impact of this cost can be factored into decisions about quality and line productivity automatically.

3. As production is often performed across different companies, when a quality issue is discovered in one company (e.g. in a subcomponent used in each of the different contract packagers), adjustments can be immediately provided across the network of contract packagers through the quality system in response to this quality issue (e.g. increasing frequency, changing tolerances, or enforcing a hold on a product).

4. Immediate/real-time feedback of changes in quality factors, more granular/detailed checking, and opportunities to make adjustments for changing quality across a disparate group of contract packagers.

A non-limiting example is now provided to illustrate various advantages of present implementations.

Figure 5:
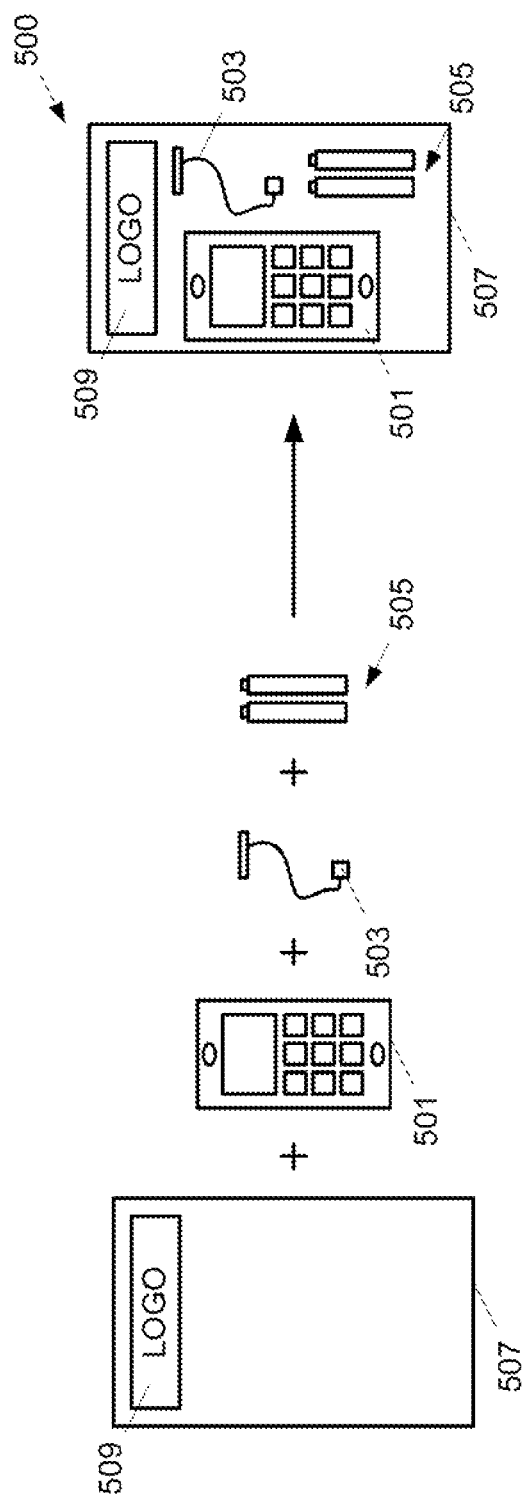
FIG. 5 depicts a product produced in the system of FIG. 1, according to non-limiting implementations.

Electronics company "Western Electronics" has contracted two contract packagers ABC and DEF to produce the same finished good: an electronics device packaged with a cable and batteries in a plastic blister pack with special promotional graphics (e.g. as in FIG. 5).

ABC begins producing the promotional blister pack. On the second day of production a quality check fails because the color of the Western Electronics logo in one case of blister packs is wrong—it does not match the specified color parameters programmed in the image processing device used by ABC.

However, a suitable data collection device 113 automatically reports the failed check to device 112 where the failed check is recorded in database 132 and alerting rule engine 350c identifies that the colour being within a given specification (e.g. between two thresholds) check is a hard requirement (e.g. compares data 414 with rules 122): i.e. the logo cannot be the wrong color. In response to the failure, alerting rule engine 350c triggers an appropriate action or actions.

For example, a recall order is issued to the retailer who received the shipment of the first day of ABC's production.

Furthermore, by accessing and/or interfacing with and/or integration with an production management system (e.g. as disclosed in Applicant's PCT Patent Application having a publication number WO 2010/060181, having an international application date of Mar. 3, 2010 and entitled "SYSTEM, METHOD, AND COMPUTER PROGRAM FOR MANUFACTURING ESTIMATION PRODUCTION ASSEMBLY AND INVENTORY MANAGEMENT", which claims priority from Applicant's U.S. Provisional Application of the same name, having Application No. 61/118,567, and filed Nov. 28, 2008), altering rule engine 350c determines that Contract Packager DEF has also received the same lot code of blister packs. However DEF has not yet noticed the issue, so (under the authority of Western Electronics) altering rule engine 350c triggers a quality control event which causes this inventory to be set with a special "quarantine" status automatically so DEF cannot use this material in production. In the present example, it is assumed that DEF is a new supplier and is not as familiar with the color rules. Further, it is assumed that DEF is performing the color check manually, for example by checking the colour against a sample logo.

It is appreciated that further integration with the production management system is contemplated, for example to issue new purchase orders for new inventory, and the like. Other actions which can be automatically triggered in the production management system by alerting rule engine 350c are within the scope of present implementations. Furthermore, in some implementations, any suitable combination of modules 250, 350 and/or database 132 can be components of the production management system.

Device 112, either through altering rule engine 350c or another suitable module, follows a rule to mark down the quality score of the manufacturer of the blister pack so that checks of their products will be required more frequently effective immediately. Hence, in addition to taking a remedial action at an entity 113, a remedial action can be further taken for a supplier or the like.

Device 112, either through altering rule engine 350c or another suitable module, notifies the project manager at Western Electronics of the issue, and further confirms that the specified remedial action has already been taken. A purchase reorder for a new batch of the blister packs can also be created automatically, pending review and approval. An estimate of the project delay and cost of this quality issue can further be provided automatically.

Western Electronics can now review all of this information together and see that the cost of the recall will be significant enough that they will have to require DEF to check logo colors on every new lot code which may increase costs, but will prevent another even more costly recall activity.

Hence, it is appreciated from this non-limiting example that present implementations can be integrated with any suitable system for issuing recall orders, purchase reorders, and managing suppliers. Indeed, in some implementations, device 112 and/or modules 350 and/or modules 250 are each modules of such a system.

It is yet further appreciated that reporting functions of present implementations can include any suitable level of complexity. For example, as in the previous example, a report of the remedial actions that occurred automatically can be provided to entity 101, as well as estimates project delays and additional costs. Further, changes to rules 122 for a given entity 103 can occur after a review of such a report, and the changes can be programmed manually for later distribution to entities 103 and/or devices 113.

It is further appreciated that data from system 100 can be used to determine quality control metrics for a product and/or a contract manufacturer/packager and/or a supplier and/or any other suitable entity or product. For example, brand owners often want to use quality check data, for example the percentage of checks which have passed/failed for a particular contract manufacturer/packager, to derive higher level metrics to determine efficiency and or effectiveness of the contract manufacturer/packager, In some implementations, a metric called "True Efficiency" (also known as "Overall Equipment Effectiveness") can be derived, at least in part, from the quality check data. Such higher level metrics can be uses to evaluate how well various suppliers, manufacturers and/or packagers are performing relative to each other, as well as whether or not they are confirming to given up to this True Efficiency standard that is being enforced.

Those skilled in the art will appreciate that in some implementations, the functionality of devices 111, 112, 113 can be implemented using pre-programmed hardware or firmware elements (e.g., application specific integrated circuits (ASICs), electrically erasable programmable read-only memories (EEPROMs), etc.), or other related components. In other implementations, the functionality of devices 111, 112, 113 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method for automatic quality control of a product being produced, the method using a plurality of computers and comprising:
 at a first computing device, maintaining a database storing a plurality of quality control rules for producing the product, the quality control rules received at the first computing device from a second computing device and a plurality of other computing devices, each of the plurality of other computing devices associated with a respective production line of a plurality of production lines for producing the product; each respective quality control rule defining an instruction relating to an attribute of a plurality of attributes for the product and at least one threshold value associated with the attribute for determining whether the respective quality control rule has been passed;
 receiving quality control data at the first computing device from a data collection device at one of the plurality of production lines, the quality control data defining an actual value for one of the attributes for the product;
 at the first computing device, in response to receiving the quality control data, determining which quality control rule of the plurality of quality control rules defines the instruction relating to the one attribute, normalizing the determined quality control rule by adjusting the determined quality control rule according to local data indicative of local conditions at the one production line, comparing the actual value defined by the quality control data with the at least one threshold value defined by the determined quality control rule; and
 when the actual value defined by the quality control data does not match the at least one threshold value defined by the determined quality control rule, providing in a web browser at the first computing device, a quality control notification indicating a failure of the determined quality control rule and transmitting the quality control notification to one or more of (i) the second computing device and (ii) at least one of the plurality of other computing devices;
 wherein the local data comprises at least one of: a local production rate for producing the product at the one production line; at least one setting at equipment for producing the product at the one production line; and at least one condition particular to the one production line.

2. The method of claim 1, further comprising:
 collecting the local data indicative of local conditions at the one production line.

3. The method of claim 2, further comprising adjusting a tolerance on the at least one threshold value based on the local data.

4. The method of claim 1, wherein the data collection device comprises:
 a mobile communication device for inputting the quality control data at electronic forms stored at the mobile communication device; and,
 an electronic data collection device for automatic collection of the quality control data, and the electronic data collection device comprises at least one of: a camera; a colorimeter, an image recognition algorithm; a character recognition algorithm; a colour detecting algorithm; an RFID (radio frequency identification) device; an RFID sensor; a barcode reader; a weigh scale; a temperature sensor; a moisture sensor; a metal detector; a vibration sensor; a pressure sensor; a gas sensor; a chemical sensor; a biological element sensor; a laser beam based reading device; a laser beam based counting device; an optical reader device; an electrical measurement device; and a counting device.

5. The method of claim 1, wherein the quality control notification further comprises at least one of:
 a recall order;
 a change in the determined quality control rule;
 updating data collection parameters at the data collection device;
 an order to quarantine inventory for the one attribute that does not meet the determined quality control rule;
 marking down a quality score of the one production line associated with the failure;
 a quality event associated with at least one of a supplier, a contract manufacturer and a contract packager for the one attribute;
 issuing a remedial action order to correct for the failure;
 an order to modify defective inventory for the one attribute to bring the defective inventory for the one attribute back into specification;
 an order to at least one of replace and supplement the one attribute with another attribute, wherein the one attribute is a component of the product being produced;
 notifying an original maker of the one component;
 an order to destroy the defective inventory for the one attribute; and
 an order to at least one of return and transport the defective inventory for the one attribute to another facility.

6. The method of claim 1, wherein the quality control rules received at the first computing device from the plurality of other computing devices associated with the plurality of production lines comprise local quality control rules for respective production lines.

7. The method of claim 1, further comprising:
 receiving further quality control data at the first computing device from a data collection device at a second one of the plurality of production lines, the further quality control data defining an actual value for a second one of the attributes;
 at the first computing device, in response to receiving the further quality control data, determining which further quality control rule of the plurality of quality control rules defines the instruction relating to the second one of the attributes, comparing the actual value for the second one of the attributes defined by the further quality control data with the at least one threshold value defined by the determined further quality control rule; and
 when the actual value for the second one of the attributes defined by the further quality control data does not match the at least one threshold value defined by the determined further quality control rule, transmitting a further quality control notification to one or more of (i) the second computing device and (ii) at least one of the plurality of other computing devices indicating failure of the determined quality control rule.

8. A computing device for automatic quality control for a product being produced, comprising:

a communication interface;
a memory; and
a processor connected to the communication interface and the memory, the processor configured to:
receive quality control rules via the communication interface from a second computing device and a plurality of other computing devices, each of the plurality of other computing devices associated with respective production line of a plurality of production lines for producing the product; each respective quality control rule defining an instruction relating to an attribute of a plurality of attributes for the product and at least one threshold value associated with the attribute for determining whether the respective quality control rule has been passed;
maintain a database storing the quality control rules in the memory;
receive quality control data from a data collection device at one of the plurality of production lines, the quality control data defining an actual value for one of the attributes;
in response to receiving the quality control data, determine which quality control rule of the plurality of quality control rules defines the instruction relating to the one attribute, normalize the determined quality control rule by adjusting the determined quality control rule according to local data indicative of local conditions at the one production line, compare the one actual value defined by the quality control data with the at least one threshold value defined by the determined quality control rule; and
when the one actual value defined by the quality control data does not match the at least one threshold value defined by the determined quality control rule, provide in a web browser at the computing device, a quality control notification indicating a failure of the determined quality control rule and transmit the quality control notification to one or more of (i) the second computing device and (ii) at least one of the plurality of other computing devices;
wherein the local data comprises at least one of: a local production rate for producing the product at the one production line; at least one setting at equipment for producing the product at the one production line; and at least one condition particular to the one production line.

9. The computing device of claim 8, wherein the data collection device is further configured to collect local data indicative of local conditions at the one production.

10. The computing device of claim 9, wherein the processor is further configured to adjust a tolerance on the at least one threshold value based on the collected local data.

11. The computing device of claim 8, wherein the quality control rules received at the computing device from the plurality of other computing devices associated with the plurality of production lines comprise local quality control rules for respective production lines.

12. The computing device of claim 8, wherein the data collection device comprises:
a mobile communication device for inputting the quality control data at electronic forms stored at the mobile communication device; and,
an electronic data collection device for automatic collection of the quality control data, and the electronic data collection device comprises at least one of: a camera; a colorimeter, an image recognition algorithm; a character recognition algorithm; a colour detecting algorithm; an RFID (radio frequency identification) device; an RFID sensor; a barcode reader; a weigh scale; a temperature sensor; a moisture sensor; a metal detector; a vibration sensor; a pressure sensor; a gas sensor; a chemical sensor; a biological element sensor; a laser beam based reading device; a laser beam based counting device; an optical reader device; an electrical measurement device; and a counting device.

13. The computing device of claim 8, wherein the quality control notification further comprises at least one of:
a recall order;
a change in the determined quality control rule;
updating data collection parameters at the data collection device;
an order to quarantine inventory for the one attribute that does not meet the determined quality control rule;
marking down a quality score of the one production line associated with the failure;
a quality event associated with at least one of a supplier, a contract manufacturer and a contract packager for the one attribute;
issuing a remedial action order to correct for the failure;
an order to modify defective inventory for the one attribute to bring the defective inventory back into specification;
an order to at least one of replace and supplement the one attribute with another attribute, wherein the one attribute is a component of the product being produced;
notifying an original maker of the component;
an order to destroy the defective inventory for the one attribute; and
an order to at least one of return and transport the defective inventory for the one attribute to another facility.

14. The computing device of claim 8, wherein the processor is further configured to:
receive further quality control data at the first computing device from a data collection device at a second one of the plurality of production lines, the further quality control data defining an actual value for a second one of the attributes;
at the first computing device, in response to receiving the further quality control data, determine which further quality control rule of the plurality of quality control rules defines the instruction relating to the second one of the attributes, comparing the actual value for the second one of the attributes defined by the further quality control data with the at least one threshold value defined by the determined further quality control rule; and
when the actual value for the second one of the attributes defined by the further quality control data does not match the at least one threshold value defined by the determined further quality control rule, transmit a further quality control notification to one or more of (i) the second computing device and (ii) at least one of the plurality of other computing devices indicating failure of the determined quality control rule.

* * * * *